United States Patent
Ganapathi et al.

(10) Patent No.: US 10,699,556 B1
(45) Date of Patent: Jun. 30, 2020

(54) SYSTEM AND METHOD FOR PLANT OPERATION GAP ANALYSIS AND GUIDANCE SOLUTION

(71) Applicant: Honeywell International Inc., Morris Plains, NJ (US)

(72) Inventors: Ramakrishnan Ganapathi, Bangalore (IN); Prangya Priyadarsini, Bangalore (IN); Anand Narayan, Uttarakhand (IN); Viraj Srivastava, New Delhi (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/290,724

(22) Filed: Mar. 1, 2019

(51) Int. Cl.
| | |
|---|---|
| *G08B 29/04* | (2006.01) |
| *G05B 19/05* | (2006.01) |
| *G08B 29/16* | (2006.01) |
| *G08B 21/02* | (2006.01) |

(52) U.S. Cl.
CPC ........... *G08B 29/04* (2013.01); *G05B 19/058* (2013.01); *G08B 21/02* (2013.01); *G08B 29/16* (2013.01); *G05B 2219/14005* (2013.01)

(58) Field of Classification Search
CPC ...... G08B 29/04; G08B 29/16; G05B 19/058; G05B 2219/14005
USPC ........................................................ 340/522
See application file for complete search history.

(56) References Cited

U.S. PATENT DOCUMENTS

| | | | |
|---|---|---|---|
| 5,758,299 A | 5/1998 | Sandborg et al. | |
| 6,119,097 A | 9/2000 | Ibarra | |
| 6,200,139 B1 | 3/2001 | Clapper | |
| 6,681,197 B2 * | 1/2004 | Brunner | G05B 19/41875 702/182 |
| 7,346,524 B2 * | 3/2008 | Goux | G06Q 30/02 705/4 |
| 7,483,842 B1 | 1/2009 | Fung et al. | |
| 7,526,467 B2 | 4/2009 | Fogel | |
| 7,565,230 B2 | 7/2009 | Gardner et al. | |
| 7,715,961 B1 | 5/2010 | Kargupta | |

(Continued)

FOREIGN PATENT DOCUMENTS

| | | |
|---|---|---|
| CN | 102034370 B | 11/2012 |
| EP | 2853968 A1 | 4/2015 |

OTHER PUBLICATIONS

Ganapathi et al., "Competency Gap Identification of an Operators Response to Various Process Control and Maintenance Conditions", U.S. Appl. No. 15/987,542, filed May 23, 2018, 51 pages.

(Continued)

*Primary Examiner* — John A Tweel, Jr.

(57) ABSTRACT

A method includes receiving one or more operating conditions from one or more field devices of one or more industrial plants in response to receiving one or more alarm signals. The method also includes determining one or more industrial plant states based on the one or more operating conditions. The method further includes identifying one or more historical alarm episodes stored in one or more data stores based on the one or more industrial plant states. In addition, the method includes identifying one or more recommended historical alarm episodes of the one or more historical alarm episodes based on one or more benchmark metrics of the one or more historical alarm episodes. The method also includes generating the one or more recommended historical alarm episodes for display on a user interface.

17 Claims, 5 Drawing Sheets

(56) References Cited

U.S. PATENT DOCUMENTS

| | | | |
|---|---|---|---|
| 7,920,935 | B2 | 4/2011 | Knipfer et al. |
| 8,055,375 | B2 | 11/2011 | Pingel et al. |
| 8,839,116 | B2 | 9/2014 | Schmidt et al. |
| 9,129,233 | B2 | 9/2015 | Moughler et al. |
| 9,315,195 | B2 | 4/2016 | Armitage et al. |
| 9,355,477 | B2 * | 5/2016 | Ashley ............... G05B 23/0272 |
| 9,569,984 | B2 | 2/2017 | Stankoulov |
| 9,659,269 | B2 * | 5/2017 | Lamoncha ............ C12Q 1/6883 |
| 10,234,853 | B2 * | 3/2019 | Mukkamala ..... G05B 19/41885 |
| 2003/0182178 | A1 | 9/2003 | D'Elena et al. |
| 2008/0071609 | A1 | 3/2008 | Yanase et al. |
| 2009/0089154 | A1 | 4/2009 | Dion |
| 2009/0299827 | A1 | 12/2009 | Puri et al. |
| 2010/0289638 | A1 | 11/2010 | Borchers et al. |
| 2011/0131082 | A1 | 6/2011 | Manser et al. |
| 2011/0307301 | A1 | 12/2011 | Laberge et al. |
| 2014/0081715 | A1 | 3/2014 | Govindaraman et al. |
| 2014/0212847 | A1 | 7/2014 | Holder et al. |
| 2014/0335480 | A1 | 11/2014 | Asenjo et al. |
| 2014/0349255 | A1 | 11/2014 | Watt et al. |
| 2015/0120318 | A1 | 4/2015 | Toyama |
| 2015/0149134 | A1 | 5/2015 | Mehta et al. |
| 2015/0222495 | A1 | 8/2015 | Mehta et al. |
| 2015/0269512 | A1 | 9/2015 | Wartel |
| 2016/0170821 | A1 | 6/2016 | Shiralkar et al. |
| 2016/0260346 | A1 | 9/2016 | Lafrinere et al. |
| 2016/0300027 | A1 | 10/2016 | Jensen et al. |
| 2017/0090466 | A1 | 3/2017 | Uomori |
| 2017/0116557 | A1 | 4/2017 | Apte et al. |
| 2017/0132104 | A1 | 5/2017 | Liu et al. |
| 2018/0322770 | A1 | 11/2018 | Srinivasan et al. |

OTHER PUBLICATIONS

Niemiec et al., "Process Performance Issues and Alarm Notification Using Data Analysis", U.S. Appl. No. 16/049,372, filed Jul. 30, 2018, 32 pages.

\* cited by examiner

SYSTEM AND METHOD FOR PLANT OPERATION GAP ANALYSIS AND GUIDANCE SOLUTION

TECHNICAL FIELD

This disclosure is generally directed to industrial process control and automation systems. More specifically, this disclosure is directed to an industrial alarm system to maintain plant safety and meet regulatory requirements.

BACKGROUND

Industrial process control and automation systems are often used to automate large and complex industrial processes. These types of control and automation systems routinely include process controllers and field devices like sensors and actuators. The process controllers typically receive measurements from the sensors and generate control signals for the actuators. In many systems, a process controller includes or is used with one or more input/output (I/O) modules, each of which can be used to provide signals to and receive signals from one or more field devices.

An industrial alarm system may be used with industrial process control and automation systems and utilize sensors to receive signals from the one or more field devices. Typical industrial alarm systems communicate indications of abnormal process conditions or equipment malfunctions provided by the received signal from the sensors to plant operators, personnel who are monitoring and operating industrial process, or personnel supporting a required response. Operator and personnel responses to communicated indications of abnormal process conditions and equipment malfunctions is inconsistent and varied.

SUMMARY

This disclosure provides an industrial alarm system to maintain plant safety and meet regulatory requirements.

In a first embodiment, a method includes receiving, by at least one processing device, one or more operating conditions from one or more field devices of one or more industrial plants in response to receiving one or more alarm signals. The method also includes determining, by the at least one processing device, one or more industrial plant states based on the one or more operating conditions. The method further includes identifying, by the at least one processing device, one or more historical alarm episodes stored in one or more data stores based on the one or more industrial plant states. In addition, the method includes identifying, by the at least one processing device, one or more recommended historical alarm episodes of the one or more historical alarm episodes based on one or more benchmark metrics of the one or more historical alarm episodes. The method also includes generating, by the at least one processing device, the one or more recommended historical alarm episodes for display on a user interface.

In a second embodiment, an apparatus includes a memory. The apparatus also includes at least one processor. The at least one processor is configured receive one or more operating conditions from one or more field devices of one or more industrial plants in response to receiving one or more alarm signals. The at least one processor is also configured to determine one or more industrial plant states based on the one or more operating conditions. The at least one processor is further configured to identify one or more historical alarm episodes stored in one or more data stores based on the one or more industrial plant states. In addition, the at least one processor is configured to identify one or more recommended historical alarm episodes of the one or more historical alarm episodes based on one or more benchmark metrics of the one or more historical alarm episodes. The at least one processor is configured to generate the one or more recommended historical alarm episodes for display on a user interface.

In a third embodiment, a non-transitory, computer-readable storage medium storing one or more computer executable instructions that, when executed by at least one processor, cause the at least one processor to receive one or more operating conditions from one or more field devices of one or more industrial plants in response to receiving one or more alarm signals. The one or more computer executable instructions also cause the at least one processor to determine one or more industrial plant states based on the one or more operating conditions. The one or more computer executable instructions further cause the at least one processor to identify one or more historical alarm episodes stored in one or more data stores based on the one or more industrial plant states. In addition, the one or more computer executable instructions cause the at least one processor to identify one or more recommended historical alarm episodes of the one or more historical alarm episodes based on one or more benchmark metrics of the one or more historical alarm episodes. The one or more computer executable instructions also cause the at least one processor to generate the one or more recommended historical alarm episodes for display on a user interface.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
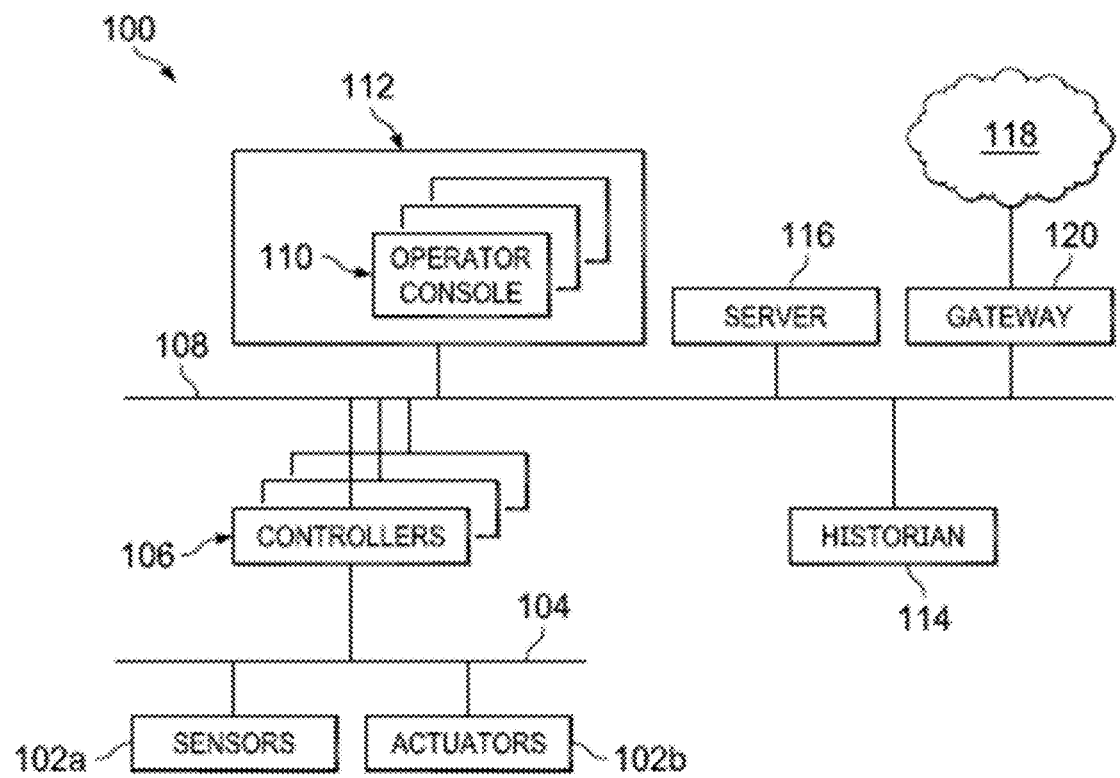
FIG. 1 illustrates an example industrial process control and automation system according to this disclosure.

FIGS. 1 through 6, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Industrial process control and automation systems may include industrial alarm systems to facilitate rapid response to various alarms and warnings for maintaining the industrial plant in an efficient, safe, and productive environment. Industrial alarm systems typically communicate indications of abnormal process conditions or equipment malfunctions to individual plant personnel including process operators, system maintenance engineers, control engineers, field engineers, technicians, and the like. The individual personnel may be responsible for making decisions to return equipment within industrial plants that are in a state of alarm to a normal state. Because different individual plant personnel have different backgrounds, different experience levels, and different competency levels, consistent and uniform responses to the same or similar alarms states may be a challenge.

Embodiments of the present disclosure include methods and systems that analyze historical industrial plant logs and processed data to perform plant operator performance gap analysis and to develop benchmark operator actions (such as the most optimal or most preferred operator actions). For example, previous alarm episodes may be recorded and/or stored to provide guidelines to individual personnel to return one or more components of an industrial plant that are in an alarm state to a normal state. An alarm episode may be defined as a particular alarm state relating to one or more specific industrial plant components (such as an alarm state related to one or more specific industrial plant processes variables and/or a plant operator context) and one or more operator actions performed by individual personnel to return the one or more specific industrial plant components from the alarm state to a normal state. Based on the analysis of historical industrial plant logs and processed data, real-time plant operating states and real-time alarms may be matched to one or more stored alarm episodes with the objective of assisting individual personnel to change an alarm state to a normal state. The methods and systems described herein may determine benchmark alarm episodes (such as the best managed alarm episodes) and select a most relevant benchmark alarm episode based on the plant operating context. U.S. patent application Ser. No. 15/987,542, filed on May 23, 2018, and entitled "COMPETENCY GAP IDENTIFICATION OF AN OPERATORS RESPONSE TO VARIOUS PROCESS CONTROL AND MAINTENANCE CONDITIONS"; and U.S. patent application Ser. No. 16/049,372, filed on Jul. 30, 2018, and entitled "PROCESS PERFORMANCE ISSUES AND ALARM NOTIFICATION USING DATA ANALYSIS" are related to concepts described herein and are hereby incorporated by reference in their respective entireties.

The methods and systems described herein may be used to retrieve (such as by an operator command or in response to an alarm signal) a diary of operator actions that a particular operator may have taken during an alarm state ("snapshotter function"). As described herein, a memory may store alarm episodes that include a specific type of alarm state and a history of operations (such as steps) that an operator took to remove the alarm state and return to a normal state. These features may allow an operator to review historical operator steps that were performed in response to an alarm to return one or more components of an industrial plant to a normal state from an alarm state. As described herein, the alarm episodes may include the context of what was happening in the industrial plant and during one or more processes to assist an operator in addressing one or more current alarms.

The methods and systems described herein may also combine the log (e.g., a diary) or history of operation actions with plant performance ("track and standardize function"). For example, the methods and systems described herein may identify workflows and operator actions that lead to an optimal or preferred outcome and provide real-time guidance to operators to reach or achieve the optimal or preferred outcome during an alarm. The methods and systems described herein may enable an operator to visualize the connection of operator actions to outcomes by person and by context. The methods and systems described herein may help identify best practice actions for specific situations and provide real-time suggestions and learning based on context and historical operator actions. The methods and systems described herein may also identify the most effective operators and why those most effective operators are the most effective. In addition, the methods and systems described herein may more quickly educate people about solving industrial plant issues with in-place learning. Process alarms, operator actions (such as operator process change logs), systems alarms, system status, points history archive data, human-machine-interface (HMI) data, engineering configurations, and the like may be data that is utilized by the methods and systems described herein.

The methods and system described herein may use data analytics to identify benchmark operator action sequences and gaps in operator performance using alarms and change log, to retrieve continuous history data for corroborating operator actions and the respective results achieved from operator actions, and to automate validation procedures to ensure accuracy. The methods and systems described herein may be used for recently hired new operational personnel, addressing plant issues linked to human errors, complying with competency assurance mandates (such as a nationalize goals), and for those who are below industry standards in competency management programs. The methods and systems described herein may provide a proactive operator guidance solution focused on process control management by assisting plant operators, identify competency gaps of individual operators and address those competency gaps, target interventions based on analysis, provide customers with performance analysis to help customer identify potential operational issues and assist in preventing operational issues from occurring, and assist in overcoming factors such as employee turnover and new technological upgrades and developments.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, flow rate, or a voltage transmitted through a cable. Also, the actuators 102b could alter a wide variety of characteristics in the process system, such as valve openings. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. For example, a controller 106 could receive measurement data from one or more sensors 102a and use the measurement data to generate control signals for one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, a WINDOWS operating system, or other operating system.

At least one network 108 couples to the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving set points or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

In certain embodiments, the historian 114 may store one or more historical alarm episodes. Historical alarm episodes may include a previous indication of one or more associated alarms (such as concurrent alarms, sequential alarms), one or more alarm types associated with the one or more alarms, one or more operating conditions (such as a process variable) associated with the one or more alarms, one or more operator actions performed in response to the alarm episode, and one or more results that occurred in response to the performed one or more operator actions. As described herein, the one or more historical alarm episodes may be used to provide one or more operator actions (such as a sequence of one or more operator actions), via a user interface (such as a display and/or a speaker), to a plant operator or personnel to bring operating conditions sensed at one or more field devices of one or more industrial plants during an alarm episode to a normal state. In certain embodiments, the one or more historical alarm episodes may be, additionally or alternatively, stored in one or more memory components of a distributed control system (DCS).

Each server 116 denotes a computing device that executes applications for users of the operator consoles 110 or other applications. The applications could be used to support various functions for the operator consoles 110, the controllers 106, or other components of the system 100. The servers can be located locally or remotely from the control and automation system 100. For instance, the functionality of the server 116 could be implemented in a computing cloud or a remote server communicatively coupled to the control and automation system 100 via a gateway such as gateway 120. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

In accordance with this disclosure, maintaining consistency and uniformity when responding to similar alarm states is critical for an efficient plant operation. The methods and systems described herein analyze historical industrial plant logs and processed data to perform Plant Operator Performance Gap Analysis and to develop benchmark operator actions. The historical industrial plant logs (such as alarm and change logs) available in the history of a plant and historical data in a distributed control system (DCS) or historian (such as historian 114) may have information of process abnormalities and the operator actions performed in response to such process abnormalities (such as process variable deviations). For example, previous alarm episodes may be recorded and/or stored to provide guidelines to individual personnel to return one or more components of an industrial plant that are in an alarm state to a normal state. An alarm episode may be defined as a particular alarm state relating to one or more specific industrial plant components (such as an alarm state related to one or more specific industrial plant processes variables and/or a plant operator context) and one or more operator actions performed by individual personnel to return the one or more specific industrial plant components from the alarm state to a normal state.

The methods and systems described herein may analyze historical data using analytic techniques to reveal benchmark operator actions (such as operator action sequences) that need to be performed and the gaps in the operator performance to respond to alarm states. Based on the analysis of historical industrial plant logs and processed data, real-time plant operating states and real-time alarms may be matched to one or more stored alarm episodes with the objective of assisting individual personnel to change an alarm state to a normal state. Gaps in operator performance may be filled with the appropriate guidance from an eventual better plant operation. Similarly, system errors and their performance indicators (such as PU consumption and CPU free) may indicate the benchmark alarm episodes and the gaps in the maintenance and systems engineers of the plant. Engineering configuration data may reveal whether the engineering is optimal and error free for developing automated guidance procedures for personnel. The methods and systems described herein may determine benchmark alarm episodes (such as the best managed alarm episodes) and select a most relevant benchmark alarm episode based on the plant operating context to return one or more components of an industrial plant in an alarm state to a normal state.

Although FIG. 1 illustrates one example of an industrial process control and automation system 100, various changes may be made to FIG. 1. For example, the control and automation system 100 could include any number of sensors, actuators, controllers, servers, networks, operator stations, operator consoles, control rooms, historians, networks, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment of an industrial plant where system operations done by the various personnel can be monitored. This functionality can be used in any other suitable system, and that system need not be used for industrial process control and automation.

Figure 2:
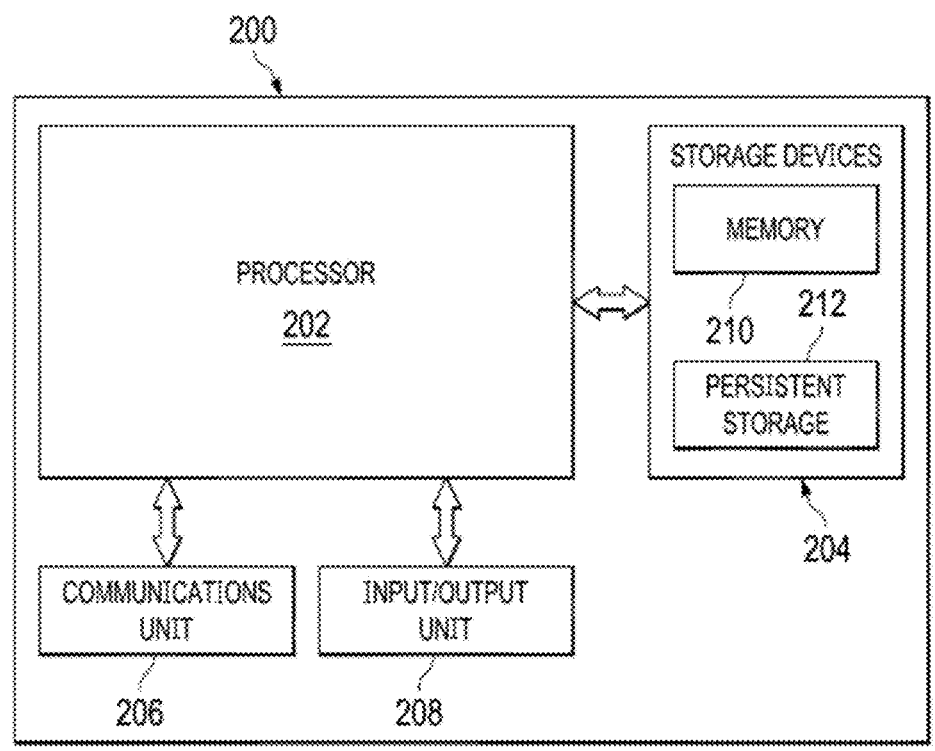
FIG. 2 illustrates an example computing device according to this disclosure.

FIG. 2 illustrates an example device for providing alarm response operation guidelines according to this disclosure. In particular, FIG. 2 illustrates an example computing device 200. In some embodiments, the computing device 200 could denote an operator station, server, a remote server or device, or a mobile device. The computing device 200 could be used to run applications. The computing device 200 could be used to perform one or more functions, such as collecting information, sorting and analyzing the information as well as generating a report of the analysis. For ease of explanation, the computing device 200 are described as being used in the system 100 of FIG. 1, although the computing device 200 could be used in any other suitable system (whether or not related to industrial process control and automation).

As shown in FIG. 2, the computing device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) configured to store and facilitate retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read-only memory, hard drive, flash memory, or optical disc.

The communications unit 206 supports communications with other systems or devices. For example, the communications unit 206 could include at least one network interface card or wireless transceiver facilitating communications over at least one wired or wireless network (such as a local intranet or a public network like the Internet). The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates example computing device 200 capable of selecting alarm episodes to provide guidelines to plant personnel for changing an alarm state to a normal state various changes may be made to FIG. 2. For example, various components in FIG. 2 could be combined, further subdivided, or omitted, and additional components could be added according to particular needs. As a particular example, processor 202 can be divided into multiple processors, such as one or more central processing units (CPUs) and one or more graphics processing units (GPUs). Also, computing device 200 can come in a wide variety of configurations, and FIG. 2 does not limit this disclosure to any particular computing device or mobile device.

As noted above, numerous individuals are required for the efficient and effective running of an industrial plant that utilizes various process control and automation systems. When one or more components of an industrial plant are in an alarm state, embodiments of the present disclosure analyze various stored alarm episodes and identify one or more benchmark alarm episodes that have been successfully used to efficiently respond to the specific alarm state to change the specific alarm state to a normal state. For example, during an alarm state, various operators, system maintenance engineers, control engineers, field engineers, technicians and the like may be provided with operator specific guidelines containing one or more operator actions unique to a specific operator from a benchmark alarm episode to return one or more components of an industrial plant and associated with the alarm state to a normal state.

Figure 3:
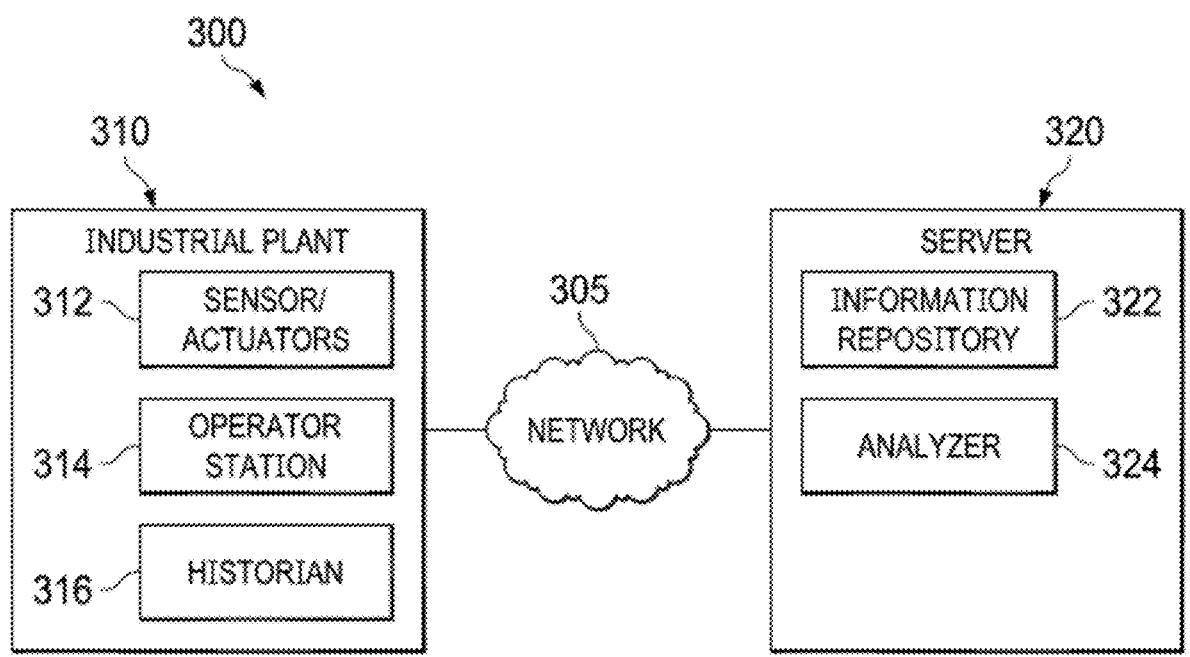
FIG. 3 illustrates an example block diagram of a communication system according to this disclosure.

FIG. 3 illustrates an example block diagram of a communication system according to this disclosure. The embodiment of the communication system 300 as shown in FIG. 3 is for illustration only. Other embodiments can be used without departing from the scope of the present disclosure. The communication system 300 includes an industrial plant 310 and a server 320 in communication over a network 305.

Network 305 is used to provide communication between the industrial plant 310 and the server 320. In certain embodiments, network 305 is similar to network 104 of FIG. 1. In certain embodiments, network 305 is similar to network 108 of FIG. 1. Network 305 can be a personal area network (PAN), a local area network (LAN), a wireless local area network (WLAN), a public switched telephone network (PSTN), or another wired or wireless network. Network 305 may also be the Internet, representing a worldwide collection of networks and gateways that use Transmission Control Protocol/Internet Protocol (TCP/IP) protocols to communicate with one another. Network 305 may include a cable, a router, switches, a firewall, or a combination thereof. Network 305 can include a variety of connections, such as, wired, wireless or fiber optic connections.

Industrial plant 310 is similar to industrial process control and automation system 100 of FIG. 1. The industrial plant 310 represents one or more industrial plants. The industrial plant 310 generally represents any system or portion thereof configured to process one or more products or other materials in some manner. The industrial plant 310 includes sensors and actuators 312, at least one operator station 314, and a historian 316.

The sensors and actuators 312 are similar to the sensors 102a and the actuators 102b of FIG. 1. In certain embodiments, sensors and actuators 312 also include equipment that is controlled by the automation system. The sensors and actuators 312 represent components in the industrial plant that perform any of a wide variety of functions. For example, sensors and actuators 312 measure various characteristics of the process system as well as alter any number of characteristics in the process system of the industrial plant 310. The sensors and actuators 312 can be automatically controlled by the process system of the industrial plant 310, manually controlled, or a combination thereof. The control and manipulation of the sensors by the personnel or the process system of the industrial plant 310, or the combination thereof can be recorded by and stored within the historian 316 in the form of alarm episodes, as discussed herein. For example, during an alarm state of one or more components of an industrial plant, an alarm episode is generated and stored in the historian 316. Each time the sensors and actuators 312 are adjusted by individual personnel during the alarm state, a record of the adjustment is stored as an operator action of the generated alarm episode. During a subsequent alarm state, an analysis may be performed, such as through analyzer 324, discussed herein to identify a benchmark alarm episode of one or more recorded and stored alarm episodes in the historian 316. The benchmark alarm episode may be related to the subsequent alarm for providing guidelines (such as operator actions) to individual personnel to change the subsequent alarm state to a normal state.

The one or more operator stations 314 are similar to the operator console 110 or the control rooms 112 of FIG. 1. Each of the one or more operator stations 314 represents computing or communication devices providing user access to the machine-level controllers, such as controllers 106 of FIG. 1. In certain embodiments, the operator consoles 110 receive and display warnings, alerts, or other messages or displays generated by various controllers of the industrial plant 310. The one or more operator stations 314 allow a user to enable or disable the various automatic controls to control the operation of the industrial plant 310. The one or more operator stations 314 can also allow the user (such as an operator or individual personnel) to adjust the operation of the sensors and actuators 312 during the operation of the industrial plant 310 and/or during an alarm state. The one or more operator stations 314 allow users to review the operational history of sensors and actuators 312. In addition, each of the one or more operator stations 314 can include any suitable structure for supporting user access and control of one or more components.

The historian 316 is similar to the historian 114 of FIG. 1. The historian 316 represents any suitable structure for storing and facilitating retrieval of information. The historian 316 can be implemented using any architecture known in the art such as, for example, a relational database, an object-oriented database, or one or more tables, or a combination thereof. The various information and data stored within the historian 316 can include confidential information, proprietary information, personnel information, operational history of the industrial plant 310, and the like. Although shown as a single centralized component within the industrial plant 310, the historian 316 could be located elsewhere in the communication system 300, or multiple historians could be distributed in different locations in the communication system 300. For example, the historian 316 can be a server or a remote server or a "cloud" of computers interconnected by one or more networks utilizing clustered computers and components to act as a single pool of seamless resources, accessible to industrial plant 310, the server 320, or both, via network 305.

The historian 316 could, for instance, store information associated with the operation of the industrial plant. For example, the historian 316 can maintain one or more logs that include the warnings, alarms, maintenance records, and process changes during the operation of the industrial plant 310 and/or during an alarm state of one or more components of the industrial plant 310. In certain embodiments, the following data can be collected by the historian 316: (i) Process alarms, (ii) Operator Process changes; (iii) System alarms; (iv) System status/events; (v) Engineering configuration changes; (vi) Piping and Instrumentation Diagrams and control narratives of process; (vii) Shift roasters and log-on information of stations; (viii) Maintenance records (Asset Management/Others); and the like. For example, process alarms include warnings and alarms that occur when one or more sensors detect a measurable characteristic that falls outside of an identified parameter. In another example a process alarm can occur when an actuator or another piece of equipment malfunctions. In another example, a process alarm can occur as a result of an operator action. For instance, an alarm can sound when an operator increases or decreases a setting beyond capabilities of the sensor, actuator, output parameter, and the like. Operator process changes occur when an operator or another personnel change one or more processes, parameters, of the automation system of the industrial plant 310. System status and events occur when any parameter changes during the operation of the industrial plant 310. Engineering configurations include various changes that an operator instructs the process to perform, such as changes to the operation of various components of the industrial plant 310.

In certain embodiments, the data collected by the historian 316 may be associated with one or more specific alarm states. The data collected by the historian 316 during an alarm state may be stored together with the one or more associated alarm state as an alarm episode. Over time, a plurality of alarm episodes may be stored in the historian 316. The analyzer 324 may determine that one or more alarm episodes of the plurality of alarm episode are benchmark alarm episodes that may be used to provide guidance to personnel when a subsequent same or similar alarm state occurs. A benchmark alarm episode may be an alarm episode associated with one or more specific alarms (such as one or more specific alarms associated with one or more specific process variable values or operating conditions) and that includes one or more operator actions that caused the alarm state to change to a normal in an efficient (such as a most efficient) way and an effective (such as a most effect) way. The analyzer 324 may mark or indicate one or more alarm episodes as benchmark alarm episodes for subsequent identification. Subsequently, when an alarm state occurs in real-time, the analyzer 324 may determine a type and/or a severity of the alarm state. The analyzer 324 may also identify one or more benchmark alarm episodes stored in the historian 316 that are most closely related to the type and/or the severity of the alarm and provide the operator actions recorded and stored with the identified benchmark alarm episode to individual personnel as guidance to change the real-time alarm state to a normal state.

The server 320 is similar to the server 116, the computing cloud 118, or a combination there of, of FIG. 1. The server 320 can be configured similar to the computing device 200 of FIG. 2. The server 320 can be a web server, a server computer such as a management server, or any other electronic computing system capable of sending and receiving data. In certain embodiments, the server 320 is a "cloud" of computers interconnected by one or more networks, where the server 320 is a computing system utilizing clustered computers and components to act as a single pool of seamless resources when accessed through network 305. In certain embodiments, the server 320 can also exist in cloud with appropriate connecting channel to a Distributed Control System (DCS). In certain embodiments, the server 320 can be used for providing guidance from a benchmark alarm episode to an operator for responding to an alarm. These measures improve the safe operation of the process as well as its efficiency. The server 320 includes an information repository 322 and an analyzer 324.

The information repository 322 can be similar to storage device 204 of FIG. 2. In certain embodiments, the historian 316 and the information repository 322 are the same entity within the high-level architecture 300. The information repository 322 can be implemented using any architecture known in the art such as, for example, a relational database, an object-oriented database, or one or more tables, or a combination thereof. The information repository 322 stores data that is collected from the industrial plant 310, an external source, or both.

In certain embodiments, the various operations performed during the operation of the industrial plant 310 are continually recorded by the historian 316. For example, the information repository 322 collects the recorded events and records from the historian 316 for processing. In another example, the information repository 322 is a control database that collects or receives various engineering configurations associated with the operation of the industrial plant. In certain embodiments, the information repository 322 can collect all the information from the historian 316 and parse through the information. In certain embodiments, the information repository 322 can determine which records (such as benchmark alarm episodes) are applicable for providing guidance to personnel for changing an alarm state to a normal state. For example, the information repository 322 can select records that concern with alarms, process changes, maintenance records, system changes, and the like.

The information repository 322 stores data that is used in the analysis to identify benchmark alarm episodes of a plurality of recorded and stored alarm episodes and to identify particular benchmark alarm episodes based on a type and/or a severity of one or more alarm states. In certain embodiments, at least a portion of the information collected, and maintained by the historian 316 can be included in the information repository 322. For example, the information repository 322 can include all the information included in the historian 316. In another example, the information repository 322 can include one or more specific categories of data such as (i) Process alarms, (ii) Operator Process changes; (iii) System alarms; (iv) System status/events; (v) Engineering configuration changes; (vi) Piping and Instrumentation Diagrams and control narratives of process; (vii) Shift roasters and log-on information of stations; (viii) Maintenance records (Asset Management/Others); (ix) alarm episodes; and/or (x) benchmark alarm episodes.

In certain embodiments, the following data can also be maintained in the information repository 322: (i) Engineering configurations; (ii) SOP/Operator Guidelines; (iii) System Performance Baseline (SPB) and Integrated Automation Assessment (IAA), if available; (iv) Custom graphics; and the like. In certain embodiments, the information repository 322 is a control database that maintains or receives various engineering configurations. In certain embodiments, the information repository 322 receives and stores the various engineering configurations from a control database.

The analyzer 324 may receive all information collected by the sensors and actuators 312 during an alarm state and store the information in the historian 316 and/or the information repository 322. During an offline operation, for example, the analyzer 324 may collect and process historical process alarms and operator actions to remove chattering and fleeting alarms, identify alarm episodes (such as to isolate each alarm, to isolate the corresponding return to normal, and to isolate all operator actions that occurred during the time of the alarm episode), identify causal pairings (such as pairing based on predictability and significance, HMI relation, and control loop data to isolate operator actions and process variables linked to a specific alarm as well as assess the degree of their linkage), and to calculate repeats and frequencies of occurrences.

Subsequently, the analyzer 324 integrates each alarm state with linked operating conditions (such as process variables) and determines one or more of an episode span, an alarm limit or process variable trip point, a maximum process variable deviation, a maximum process variable span, a rate of process variable change, or an area under the curve (AUC). An episode span includes a time between an alarm initiation and the corresponding return to normal state. Generally, a smaller or shorter episode span may be more desirable and indicate a well-managed alarm. An alarm limit or process variable trip point includes value threshold for triggering an alarm. This value may be used calculate a deviation of the process variable. The maximum process variable deviation includes a maximum deviation from the alarm limit or process variable trip point. This value may be used to assess a severity of the alarm. A maximum process variable span includes a time between an alarm initiation and a time when the maximum process variable deviation is reached. This value may be used to access the criticality of the alarm and the rate of response to the process variable. A rate of change of the process variable or a rate of process variable change includes a rate at which the process variable is deviating from the limit or process variable trip point. A high rate of change may indicate a higher criticality. The AUC includes an integral of the area between the process variable curve and the alarm limit or process variable trip point. This value may be used to assess whether the alarm was managed appropriately by the operator.

The analyzer 324 may link operator actions for each isolated alarm episode (such as from a determined causal pairing metric) to determine one or more of a time of first operator action, a quantity of operator actions, a frequency of operator actions during an alarm episode, and tags (such as sensors, plant components, process variable or operating conditions) acted upon by the operator during an alarm episode.

The time of first operation action includes a time between an alarm and the corresponding first operator action. This parameter may be used to determine whether a larger episode span is caused because of a delayed response by an operator. This parameter may be used to determine a potential gap in operator competency. A quantity of operation actions include a total quantity of operator actions for each tag acted upon by an operator. This parameter may be used to analyze whether the operator is changing one or more process variables in appropriate sized increments. This parameter may also be used to determine a potential gap in operator competency. The frequency of operator actions during an alarm episode includes a rate at which the operator is making process changes. This parameter may be used to determine a potential gap in operator competency. Tags acted upon by an operator during an alarm episode include tags changed by the operator to bring the process variable in an alarm state to a normal state. This parameter may be used to determine whether the operator is manipulating the appropriate tags to respond to the one or more alarms.

In certain embodiments, the analyzer 324 can generate alarm episodes. An alarm episode includes the start of an alarm or warning through the return of normal operating conditions as well as all the changes the operator executed within the system to return the system to normal operating conditions. Stated differently an episode spans the time between an alarm event and the corresponding return to normal event. The analyzer 324 can identify the number of changes the operator executed to return the system to normal operating conditions. Additionally, the analyzer 324 can identify the duration of time it took the operator to return the system to normal operating conditions. The analyzer 324 can also store each alarm episode in the historian 316 and/or the information repository 322.

The analyzer 324 parses information (such as, history, configuration, and the like) stored in the historian 316 and/or the information repository 322 and sorts the information into groups. In certain embodiments, each group indicates a particular skill associated with the running and operating the industrial plant 310. For example, one group can include all responses performed by personnel when a specific alarm occurs. In another example, one group can include particular changes executed by personnel to the processes of the industrial plant.

In certain embodiments, the analyzer 324 can assess the information within each group to identify one or more benchmark alarm episodes (such as one or more recommended historical alarm episodes). A benchmark alarm episode may include a best response to or a best action taken as a result of an alarm or an alarm state of one or more components of the industrial plant. In certain embodiments, a benchmark alarm episode is the integral of the difference between the actual and alarm trip point during the span of the alarm, identified as an index value (such as the area under the curve (AUC)). A benchmark alarm episode may be alarm episodes that have the lowest 80% of the AUC. The index value is the value associated with each instance the processing values associated with the operation of the industrial plant 310 exceeds an alarm trip point. The alarm trip point is a value or parameter that a processing value associated with the operation of the industrial plant 310 is not to exceed. The benchmark (such as benchmark alarm episode) is identified as the smallest highlighted area of similar alarms.

In certain embodiments, a benchmark alarm episode may be the quickest response, the fewest number of changes, or a combination thereof, while violating no plant rules or engineering guidelines to resolve a warning or an alarm. For example, the benchmark response time to an alarm is the shortest duration of time taken or the fewest number of changes the operator executed to return the system to normal operating conditions, as compared to the other responses to a similar alarm type. In another example, the benchmark response to a system process may be a fewest amount of additional adverse conditions that were generated while a response to an alarm was executed, as compared to other similar responses to similar alarms. The analyzer 324 may compare the data within each alarm episode of a group of alarm episodes to determine one or more benchmark alarm episodes (such as one or more recommended historical alarm episodes). In certain embodiments, as described herein, the benchmark alarm episode is presented in a display or in a report to provide instructions on responding to various types of alarms.

In certain embodiments, the analyzer 324 may determine one or more benchmark alarm episodes by grouping alarm occurrences with episode metrics (such as process variable values or operating conditions) to form groups of alarm episodes. Each group of alarm episodes may be sorted based on an AUC of each alarm episode. For instance, alarm episodes with the highest 20% of AUCs within a group may not be considered. Central tendencies may be calculated for episode metrics of the remaining 80% of the alarm episodes. In certain embodiments, episodes may be further grouped based on the similarities in the tags acted upon by operators or similarities in a rate of change of a process variable. In certain embodiments, a summary of the resulting group of alarm episodes may be stored as benchmark alarm episodes for a particular plant state and process variables (such as operating conditions). The summary may include operator tags to be acted upon, their change increments, and a time window for executing the change increments.

In accordance with certain embodiments of the present disclosure, such as during an online process, the analyzer 324 may receive one or more operating conditions from one or more field devices (such as through one or more sensors sensing a field device) of one or more industrial plants. For example, the analyzer 324 in a combustion control system (CCS) and burner management system (BMS) of a refinery may receive a high outlet temperature value of a fuel line before, during, or after (such as in response to) receiving one or more alarm signals. An alarm signal may indicate an alarm state of one or more components of an industrial plant. The alarm signal may be a signal indicating that one or more components of the refinery are in an alarm state. As another example, the analyzer 324 may receive all operating conditions related to the one or more alarm signals and isolate the one or more operating conditions of all of the operating conditions based on one or more similarity patterns of the one or more operating conditions.

The analyzer 324 may determine one or more industrial plant states based on the one or more operating conditions. For example, the analyzer 324 may determine that the industrial plant state is one or more of a startup state, a shutdown state, or a process-related state (such as a fuel switch in a fire heater). In certain embodiments, the industrial plant state includes one or more specific operating conditions (such as process variables) associated with one or more components of one or more industrial plants. The industrial plant states are used to group similar alarm episodes together to derive one or more benchmark alarm episodes suitable for a particular alarm state. The industrial plant state of an industrial plant may be assessed based on alarm grouping, values of linked process variables, and user station metrics.

The analyzer 324 may determine an industrial plant state based on values of linked operating conditions (such as process variables). The analyzer 324 may analyze results of causal pairings to determine which operating conditions are linked. The analyzer 324 may analyze patterns (such as steady state or dynamic patterns including current valves compared to threshold) of linked process variables to determine an industrial plant state. In certain embodiments, the analyzer 324 may group patterns of process variables including rates of change using statistical clustering algorithms to determine an industrial plant state.

The analyzer 324 may determine an industrial plant state based on operating conditions associated with one or more user stations. For example, the analyzer 324 may use operating conditions associated with one or more user stations (such as a rate of received alarms) to evaluate a state of equipment and/or an operator work load. A relatively high rate of alarms may indicate a plant state of a relatively high severity and separate and/or additional analysis may be used. A relatively high rate of operator actions may indicate a transition in operating conditions and separate and/or additional analysis may be used.

The analyzer 324 may identify one or more historical alarm episodes (such as alarm episodes recorded and stored in the historian 316 and/or the information repository 322) based on one or more industrial plant states. In certain embodiments, the one or more historical alarm episodes may include one or more previously performed operator actions that were used to return one or more components of an industrial plant to a normal state from an alarm state. The previously performed operator action may be used to return one or more components of an industrial plant to a normal state from an alarm state in real-time.

For example, the analyzer 324 may have previously determined that a group of alarm episodes are associated with one or more particular industrial plant states. For instance, the analyzer 324 may have previously determined that a group of alarm episodes are associated with one or more particular industrial plant states based on the group alarm episodes having duplicate alarms. For instance, the analyzer 324 may have previously determined that a group of alarm episodes are associated with one or more particular industrial plant states based on the group alarm episodes having consequential alarms. For instance, the analyzer 324 may have previously determined that a group of alarm episodes are associated with one or more particular industrial plant states based on the group alarm episodes having a common cause. Alarm grouping embodiments may be described in U.S. patent application Ser. No. 15/588,056, filed on May 5, 2017 and entitled "METHOD FOR ANALYTICS-DRIVEN ALARM RATIONALIZATION, ASSESSMENT OF OPERATOR RESPONSE, AND INCIDENT DIAGNOSIS AND RELATED SYSTEMS," which is hereby incorporated by reference in its entirety. When the analyzer 324 determines the industrial plant state based on the operating conditions received when receiving an alarm signal, the analyzer 324 may identify a group of historical alarm episodes that have been grouped together and associated with one or more particular industrial plant states that match or are associated with the determined industrial plant state.

The analyzer 324 may identify one or more recommended historical alarm episodes (such as benchmark alarm episodes) of the one or more identified historical alarm episodes. A recommended historical alarm episode (such as a benchmark alarm episode) may include a best response to or a best action taken as a result of an alarm or an alarm state of one or more components of the industrial plant. In certain embodiments, the analyzer 324 may have previously determined that one or more alarm episodes from each group of alarm episodes are recommended alarm episodes based on one or more benchmark metrics. In certain embodiments, after receiving an alarm signal indicating an alarm state of one or more components of an industrial plant, the analyzer 324 may determine that one or more alarm episodes from a group of alarm episodes associated with one or more determined industrial plant states are recommended alarm episodes based on one or more benchmark metrics.

A benchmark metric may include at least one of an integral of a difference between an actual and alarm trip point during a span of an alarm of the alarm episode, quantity of operator actions that require a least amount of time to return one or more components of an industrial plant to a normal state from an alarm state, a fewest quantity of operator actions to be performed to return one or more components of an industrial plant to a normal state from an alarm state, a fewest quantity of additional adverse conditions that would be generated by performed operator actions to return one or more components of an industrial plant to a normal state from an alarm state, a fewest quantity of plant rules or engineering guidelines that need to be violated to return one or more components of an industrial plant to a normal state from an alarm state, a combination thereof, or the like. The analyzer 324 may compare the data within each alarm episode of a group of alarm episodes to determine one or more benchmark alarm episodes (such as one or more recommended historical alarm episodes) within a group of alarm episodes.

The analyzer 324 may generate the one or more recommended historical alarm episodes (such as one or more benchmark alarm episodes) for display on a user interface. For example, each of the one or more recommended historical alarm episodes may including one or more operator actions that require a least amount of time to return one or more components of an industrial plant to a normal state from an alarm state, that have a fewest quantity to return one or more components of an industrial plant to a normal state from an alarm state, that have a fewest quantity of additional adverse conditions that would be generated by performed operator actions to return one or more components of an industrial plant to a normal state from an alarm state, that have a fewest quantity of plant rules or engineering guidelines that need to be violated to return one or more components of an industrial plant to a normal state from an alarm state, a combination thereof, or the like of one or more groups of alarm episodes associated with the one or more determined industrial plant states. The one or more operator actions may be followed by operators and in accordance with one or more procedures included in the one or more recommended historical alarm episodes to return one or more components of an industrial plant to a normal state from an alarm state in real-time.

In certain embodiments, after the analyzer 324 generates the one or more recommended historical alarm episodes for display on the user interface, the analyzer 324 may receive an indication of one or more real-time operator actions. For example, the analyzer 324 may generate for display the one or more operator actions that are for following by operators in accordance with one or more procedures included in the one or more recommended historical alarm episodes to return one or more components of an industrial plant to a normal state from an alarm state in real-time. Subsequently, the analyzer 324 may detect or receive an indication that one or more real-time operator actions are being performed in real-time causing one or more actuators to move in real-time and/or causing one or more sensors to sense one or more parameter changes in real-time.

In certain embodiments, after the analyzer 324 generates the one or more recommended historical alarm episodes for display on the user interface, the analyzer 324 may compare the one or more real-time operator actions with the one or more operator actions contained in the one or more recommended historical alarm episodes generated for display. For example, the analyzer 324 may generate for display the one or more operator actions that are for following by operators in accordance with one or more procedures included in the one or more recommended historical alarm episodes to return one or more components of an industrial plant to a normal state from an alarm state in real-time. Subsequently, the analyzer 324 may detect or receive an indication that one or more real-time operator actions are being performed in real-time causing one or more actuators to move in real-time and/or causing one or more sensors to sense one or more operation condition changes in real-time. The analyzer 324 may then compare the real-time operator actions with the one or more operator action included in the one or more recommended historical alarm episodes. In certain embodiments, the analyzer 324 may also compare the real-time movement of the one or more actuators and/or the real-time changes sensed by the one or more sensors with expected actuator movement and/or expected operation conditions changes.

In certain embodiments, after the analyzer 324 generates the one or more recommended historical alarm episodes for display on the user interface, the analyzer 324 may categorize the one or more real-time operator actions based on the comparison of the one or more real-time operator actions with the one or more previously performed operator actions. For example, after the analyzer 324 compares the real-time operator actions with the one or more operator action included in the one or more recommended historical alarm episodes, the analyzer 324 may determine how closely the real-time operator actions match the one or more operator action included in the one or more recommended historical alarm episodes. In certain embodiments, the analyzer 324 may also determine how closely real-time movement of one or more actuators and/or real-time changes sensed by the one or more sensors matches with expected actuator movement and/or expected operation conditions changes. The analyzer 324 may categorize the one or more real-time operator actions based on the match.

In certain embodiments, the analyzer 324 may categorize the one or more real-time operator actions based on a time when the at least one processing device receives the one or more operating conditions and a time when the analyzer 324 receives an indication of one or more normal operating conditions. In certain embodiments, the analyzer 324 may categorize the one or more real-time operator actions based on a quantity of the one or more real-time operator actions received in the indication of the one or more real-time operator actions and a quantity of the one or more previously performed operator actions from the one or more recommended historical alarm episodes. The analyzer 324 may categorize the one or more real-time operator action into at least one of the following categories: "follows benchmarked alarm episode", "deviated in selection of responses", "deviated in magnitude of responses" (increments/rates of manipulations), "deviation response time", "presence of inadvertent operator actions", a combination thereof, or the like.

The analyzer 324 can rank or rate operators in their response to alarms and running the various processes of the industrial plant 310 optimally. For example, the analyzer 324 analyzes a selection of alarms within a particular alarm grouping and identifies a correct quantitative response. The correct quantitative responses can include increments or rate of manipulations executed by each operator in order to resolve the alarm, and return the process to a non-alarm state. The analyzer 324 can also assess the response to of each operator for particular alarms. For example, the response time can include the total time it takes an operator to resolve the issue. In another example the response time can include the time it took the operator to commence addressing the alarm. The analyzer 324 can also assess the operators responses based on avoiding inadvertent operations while responding to a particular alarm. For example, the analyzer 324 can identify operations that an operator executed that are unnecessary, redundant, or wrong incorrect when responding to an alarm state.

In certain embodiments, the analyzer 324 can rank or rate personnel by assessing an alarm episode characteristic and the operators response to the alarm. For example, the analyzer 324 can derive the time between an alarm and the first action of an operator as well as the time between the start of the alarm event and the return to normal event. The analyzer 324 can also derive the maximum deviation of the trip point. The trip point is the value configured for the alarm event to trigger. For example, the trip point indicates a value as to when an alarm occurs based on one or more system parameters. The analyzer 324 can also derive the time between an alarm event and the maximum deviation from the trip point. The analyzer 324 can then map a portion or all the information to compare each operator.

The analyzer 324 can also rank or rate control system maintenance engineers based on minimizing defects in the control configurations and process optimization skills. For example, the analyzer 324 can assess when a particular configuration violates a Front End Engineering Design (FEED) rule. FEED rules include various rules and conventions to be followed during the operation of the industrial plant 310. In another example, the analyzer 324 can assess when a particular configuration contains logical errors. The analyzer 324 can also rank or rate control system maintenance engineers based on implementation of custom graphics such as optimization of parameter access. The analyzer 324 can also rank or rate control system maintenance engineers based on alarm configurations, advanced application data access optimization, controller input and outputs, SPB reporting, or a combination thereof.

In certain embodiments, the analyzer 324 can compare each personnel to the derived bench mark. For example, bench marks can be established based on how an operator responds to an alarm as well as an engineer is able to establish a control configuration with minimal defects. Thereafter the analyzer 324 compares the information within each group to the derived bench mark. The closer each personnel is to the bench mark the higher the rank, and conversely the further away each personnel is from the bench mark the lower the rank.

In certain embodiments, the rank of each personnel is a rating that indicates how well each individual performs with respect to the bench mark or the peers of the individual. For example, if all the personnel within a particular episode group respond similarly, the rating of the personnel will be similar. In certain embodiments, each personnel may be ranked for responding to specific alarms when receiving guidance from one or more benchmark alarm episodes. The rankings may include "follows benchmark alarm episode", "deviates in selection of responses", "deviation in magnitude of responses" (such as increments/rate of manipulations), "deviation in response time", or "presence of inadvertent operations", or the like.

For an example use case, a process analysis of a Combustion Control System (CCS) and Burner Management System (BMS) of a refinery was performed. The objective of the fired heater in this context is to maintain the outlet process stream header temperature typically by controlling the purge steam fluidized fuel oil. To increase the product temperature, the firing in the burner furnace may be increased using the following sequence. First, the fuel supply may be increased by increasing the combined fuel flow set point. Second, the oil supply and/or the gas supply may be increased. The oil supply may be increased by increasing the pressure set point to add more purge steam or by increasing the flow set point of the oil supply line. The gas supply may be increased by increasing the pressure set point of the gas supply line or by increasing the flow set point of the gas supply line. Third, the combustion air (such as oxygen) concentration may be increased to maintain a proper fuel-to-air ratio (FAR).

Fourth, the process flow may be decreased. TABLE 1 produced below indicates the potential alarms that may be initiated in the above scenarios, as well as the benchmark alarm episode operator actions that may be used to perform operator performance gap analysis.

TABLE 1

| High Alarm KPI's | Benchmark Operator Actions | Specific Alarm Tags |
| --- | --- | --- |
| High outlet temperature | a. Decrease the pressure in the fuel lines<br>b. Correspondingly decrease the FAR<br>c. Decrease the required outlet temperature set point | HEAD OUTLET P6141 |
| High total fuel flow | a. Decrease the pressure control in gas and oil line<br>b. If flow is reduced, ensure corresponding FAR is also reduced.<br>c. Decrease the required outlet temperature set point | TOTAL FUEL SRF TO P6141 |
| High fuel gas flow | Decrease the pressure control in gas line | FUEL GAS TO P6141 |
| High fuel oil flow | Decrease the pressure control in oil line | FUEL OIL TO P6141 |
| High fuel gas pressure | a. Decrease the pressure control in gas line<br>b. Decrease the FAR pressure | FUEL GAS TO P6141 |
| High fuel oil pressure | a. Decrease the pressure control in oil line<br>b. Decrease the FAR pressure | FUEL OIL TO P6141 |
| High pass flow in a specific line | Decrease corresponding pass valve opening directly<br>NOTE: Averaging of the 8 passes are done. | PASS * TO P6141 |
| High pass temperature in a specific line | a. Decrease the pressure control in oil line<br>b. Decrease the FAR pressure | PASS * OUTLET P6141 |
| High skin temperature in a specific line (chance of a leak) | a. Decrease the fuel flow<br>b. Decrease the outlet temperature requirement | SKIN TEMP P6141 PASS 1 |
| High flow or temperature on pass preheating | Decrease the corresponding temperature and flow set point | BLR CIRC WTR FROM Q6115 |

Figure 4:
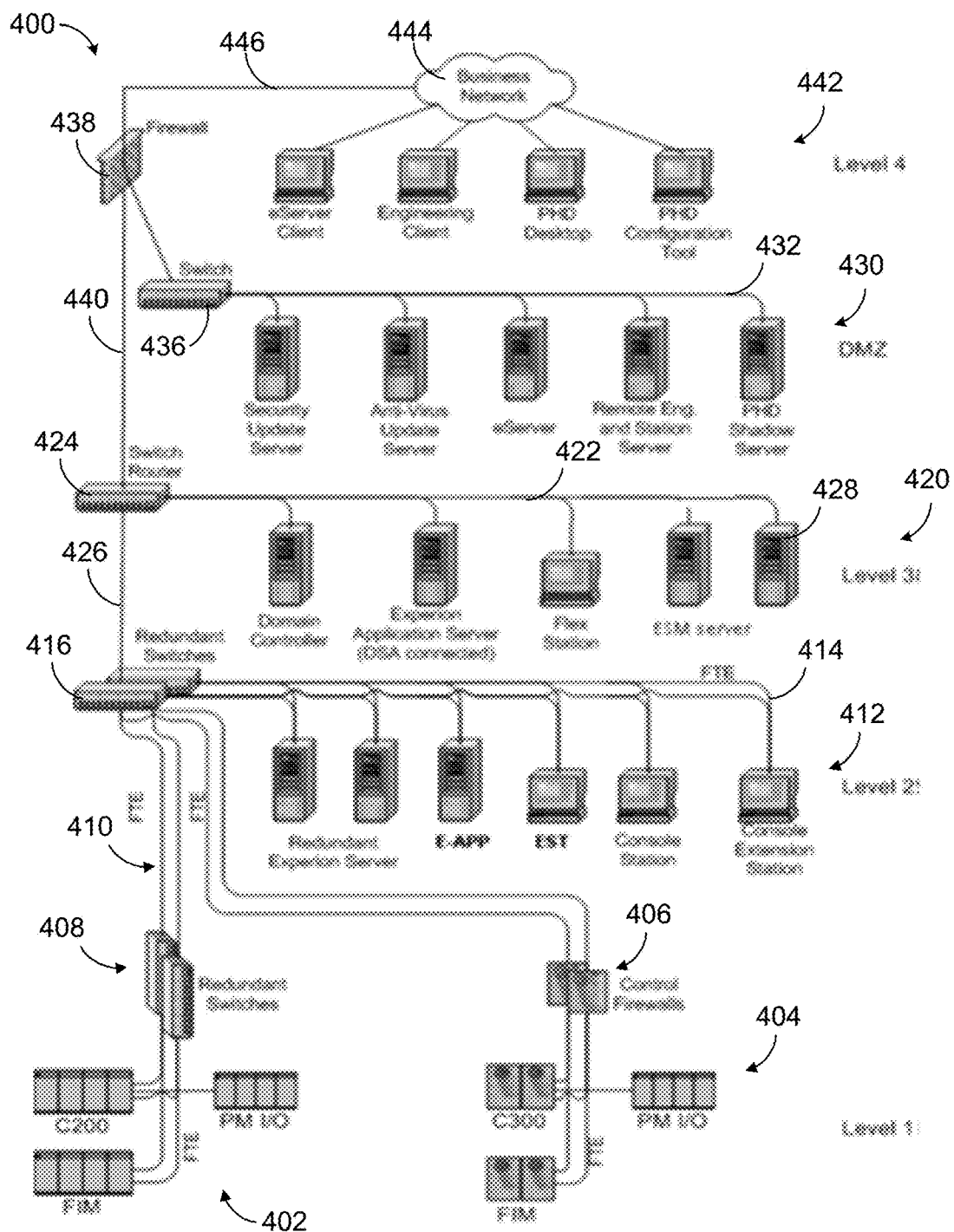
FIGS. 4 and 5 illustrate example industrial process control and automation systems according to this disclosure.

FIG. 4 illustrates an example industrial process control and automation system 400 according to this disclosure. The example industrial process control and automation system 400 illustrated in FIG. 4 may be the same or at least similar to the example industrial process control and automation system 100 illustrated in FIG. 1 or the communication system 300 illustrated in FIG. 3. The example industrial process control and automation system 400 illustrated in FIG. 4 may also include one or more same or similar components of the example industrial process control and automation system 100 illustrated in FIG. 1 or the communication system 300 illustrated in FIG. 3. Additionally, or alternatively, one or more components of the example industrial process control and automation system 400 illustrated in FIG. 4 may include the computing device 200 illustrated in FIG. 2 or may include one or more similar components or features as the computing device 200 illustrated in FIG. 2. The industrial process control and automation system 400 illustrated in FIG. 4 may be for on site or on premises deployment of a server (such as a data analytic server) including an analyzer (such as analyzer 324 illustrated in FIG. 3).

As shown in FIG. 4, the system 400 includes various components that facilitate production or processing of at least one product or other material. For instance, the system 400 is used here to facilitate control over components in one or multiple plants. Each plant represents one or more processing facilities (or one or more portions thereof), such as one or more manufacturing facilities for producing at least one product or other material. In general, each plant may implement one or more processes and can individually or collectively be referred to as a process system. A process system generally represents any system or portion thereof configured to process one or more products or other materials in some manner.

In FIG. 4, the system 400 is implemented using the Purdue model of process control. In the Purdue model, "Level 1" may include a first set of one or more sensors and one or more actuators 402 and a second set of one or more sensor and one or more actuators 404. In certain embodiments, the first set of one or more sensors and one or more actuators 402 may include a C200 sensor, an FIM actuator, and PM I/O device. In certain embodiments, the second set of one or more sensors and one or more actuators 404 may include a C300 sensor, an FIM actuator, and PM I/O device. The sensor and actuators may be the same as the sensors and actuator described herein. The sensors and actuators may represent components in a process system that may perform any of a wide variety of functions. For example, the sensors could measure a wide variety of characteristics in the process system, such as temperature, pressure, or flow rate. Also, the actuators could alter a wide variety of characteristics in the process system. The sensors and actuators could represent any other or additional components in any suitable process system. Each of the sensors includes any suitable structure for measuring one or more characteristics in a process system. Each of the actuators includes any suitable structure for operating on or affecting one or more conditions in a process system. In certain embodiments, the first set of sensors and actuators 402 may be coupled to a network 410 via one or more switches 408 and the second set of sensors and actuators 404 may be coupled to the network 410 via one or more control firewalls 406. In certain embodiments, the network 410 could represent a pair of Ethernet networks or a redundant pair of Ethernet networks, such as a FAULT TOLERANT ETHERNET (FTE) network from HONEYWELL INTERNATIONAL INC.

At least one network may be coupled to each of the first set and the second set of sensors and actuators. The network facilitates interaction with the sensors and actuators. For example, the network could transport measurement data from the sensors and provide control signals to the actuators. The network could represent any suitable network or combination of networks. As particular examples, the network could represent an Ethernet network, an electrical signal network (such as a HART or FOUNDATION FIELDBUS network), a pneumatic control signal network, or any other or additional type(s) of network(s).

In the Purdue model, "Level 2" may include one or more servers 412 (such as controllers) which are coupled to the network 410 of "Level 1" using a network 414 and one or more redundant switches 416. Among other things, each of the servers 412 may use the measurements of sensors and control actuators from first and second set of sensors and actuators 402 and 404, respectively. For example, one of the servers 412 could receive measurement data from one or more sensors and use the measurement data to generate control signals for one or more actuators. Each of servers 412 may include any suitable structure for interacting with one or more sensors and controlling one or more actuators. Each of the servers 412 could, for example, represent a multivariable controller, such as a Robust Multivariable Predictive Control Technology (RMPCT) controller or other type of controller implementing model predictive control (MPC) or other advanced predictive control (APC). As a particular example, each server 412 could represent a computing device running a real-time operating system. In certain embodiments, the servers 412 may include one or more redundant Experion Servers, an E-APP, an EST, a console station, and a console extension station.

The network 414 is coupled to the servers 412. The network 414 facilitates interaction with the each of the servers 412, such as by transporting data to and from the servers 412. The networks 414 could represent any suitable networks or combination of networks. As particular examples, the network 414 could represent a pair of Ethernet networks or a redundant pair of Ethernet networks, such as a FAULT TOLERANT ETHERNET (FTE) network from HONEYWELL INTERNATIONAL INC.

At least one switch/firewall 416 couples the network 414 to the network 410. The switch/firewall 416 may transport traffic from one network to another. The switch/firewall 416 may also block traffic on one network from reaching another network. The switch/firewall 416 includes any suitable structure for providing communication between networks, such as a HONEYWELL CONTROL FIREWALL (CF9) device. The networks 414 could represent any suitable networks, such as a pair of Ethernet networks or an FTE network.

In the Purdue model, "Level 3" may include one or more machine-level servers 420 (such as controllers) coupled to the network 422. The machine-level severs 420 perform various functions to support the operation and control of the servers, sensors, and actuators, which could be associated with a particular piece of industrial equipment (such as a boiler or other machine). For example, the machine-level servers 420 could log information collected or generated by the servers 412, such as measurement data from the sensors or control signals for the actuators. The machine-level servers 420 could also execute applications that control the operation of the servers 412, thereby controlling the operation of the actuators. In addition, the machine-level servers 420 could provide secure access to the servers 412. Each of the machine-level servers 420 includes any suitable structure for providing access to, control of, or operations related to a machine or other individual piece of equipment. Each of the machine-level server 420 could, for example, represent a server computing device running a MICROSOFT WINDOWS operating system. Although not shown, different machine-level server 420 could be used to control different pieces of equipment in a process system (where each piece of equipment is associated with one or more servers 412, sensors, and actuators).

The machine-level servers 420 may include one or more operator stations coupled to the networks 422. The operator stations represent computing or communication devices providing user access to the machine-level servers 420, which could then provide user access to the servers 420 (and possibly the sensors and actuators). As particular examples, the operator stations could allow users to review the operational history of the sensors and actuators using information collected by the servers 412 and/or the machine-level servers 420. The operator stations could also allow the users to adjust the operation of the sensors, actuators, servers 412, or machine-level servers 420. In addition, the operator stations could receive and display warnings, alerts, or other messages or displays generated by the servers 412 or the machine-level servers 420. Each of the operator stations includes any suitable structure for supporting user access and control of one or more components in the system 400. Each of the operator stations could, for example, represent a computing device running a MICROSOFT WINDOWS operating system. In certain embodiments, the machine-level servers 420 may include a domain controller, an Experion Application server (DSA connected), flex station, an ESM server, and a data analytic server 428 including an analyzer (such as the analyzer 324 illustrated in FIG. 3).

At least one router/firewall 424 couples the network 422 to the network 426 and the redundant switches 416. The router/firewall 424 includes any suitable structure for providing communication between networks, such as a secure router or combination router/firewall. The networks 422 and 426 could represent any suitable networks, such as a pair of Ethernet networks or an FTE network.

In the Purdue model, "Level DMZ" may include one or more unit-level servers 430 (such as a controller) coupled to the networks 432. Each unit-level server 430 is typically associated with a unit in a process system, which represents a collection of different machines operating together to implement at least part of a process. The unit-level servers 430 perform various functions to support the operation and control of components in the lower levels. For example, the unit-level servers 430 could log information collected or generated by the components in the lower levels, execute applications that control the components in the lower levels, and provide secure access to the components in the lower levels. Each of the unit-level servers 430 includes any suitable structure for providing access to, control of, or operations related to one or more machines or other pieces of equipment in a process unit. Each of the unit-level server 430 could, for example, represent a server computing device running a MICROSOFT WINDOWS operating system. Although not shown, different unit-level servers 430 could be used to control different units in a process system (where each unit is associated with one or more machine-level servers 420, servers 412, sensors, and actuators). In certain embodiments, the unit-level servers 430 may include a security update server, an anti-virus update server, an eServer, a remote engineering and station server, and a PHD shadow server.

Access to the unit-level servers 430 may be provided by one or more operator stations. Each of the operator stations includes any suitable structure for supporting user access and control of one or more components in the system 400. Each of the operator stations could, for example, represent a computing device running a MICROSOFT WINDOWS operating system.

At least one switch 436 and at least one firewall 438 couples the networks 432 to the network 440 and the router/firewall 424. The switch 436 and firewall 438 may include any suitable structure for providing communication between networks, such as a secure router or combination router/firewall. The networks 432 could represent any suitable networks, such as a pair of Ethernet networks or an FTE network.

In the Purdue model, "Level 4" may include one or more plant-level servers 442 (such as a controller) coupled to the network 444 and the network 446. Each plant-level servers 442 is typically associated with one of the plants, which may include one or more process units that implement the same, similar, or different processes. The plant-level servers 442 perform various functions to support the operation and control of components in the lower levels. As particular examples, the plant-level servers 442 could execute one or more manufacturing execution system (MES) applications, scheduling applications, or other or additional plant or process control applications.

Each of the plant-level servers 442 includes any suitable structure for providing access to, control of, or operations related to one or more process units in a process plant. Each of the plant-level servers 442 could, for example, represent a server computing device running a MICROSOFT WINDOWS operating system. In certain embodiments, the plant-level servers 442 may include an eServer, an engineering client, a PHD desktop, and a PHD configuration tool.

Access to the plant-level servers 442 may be provided by one or more operator stations. Each of the operator stations includes any suitable structure for supporting user access and control of one or more components in the system 400. Each of the operator stations could, for example, represent a computing device running a MICROSOFT WINDOWS operating system.

At least one firewall 438 couples the networks 444 and 446 to the network 440, the switch 436, and the router/firewall 424. The switch 436 includes any suitable structure for providing communication between networks, such as a secure router or combination router/firewall. The networks 444 and 446 could represent any suitable network, such as an enterprise-wide Ethernet or other network or all or a portion of a larger network (such as the Internet).

In the Purdue model, "Level 5" may include one or more enterprise-level servers (controllers) coupled to a network in communication with the network 446. Each enterprise-level server is typically able to perform planning operations for multiple plants and to control various aspects of the plants. The enterprise-level servers can also perform various functions to support the operation and control of components in the plants. As particular examples, the enterprise-level servers could execute one or more order processing applications, enterprise resource planning (ERP) applications, advanced planning and scheduling (APS) applications, or any other or additional enterprise control applications. Each of the enterprise-level servers includes any suitable structure for providing access to, control of, or operations related to the control of one or more plants. Each of the enterprise-level servers could, for example, represent a server computing device running a MICROSOFT WINDOWS operating system. In this document, the term "enterprise" refers to an organization having one or more plants or other processing facilities to be managed. Note that if a single plant is to be managed, the functionality of the enterprise-level servers could be incorporated into the plant-level servers 442.

Access to the enterprise-level servers may be provided by one or more operator stations. Each of the operator stations includes any suitable structure for supporting user access and control of one or more components in the system 400. Each of the operator stations could, for example, represent a computing device running a MICROSOFT WINDOWS operating system.

Various levels of the Purdue model can include other components, such as one or more databases or data stores. The database(s) associated with each level could store any suitable information associated with that level or one or more other levels of the system 400. For example, a historian can be coupled to one or more of the networks. The historian could represent a component that stores various information about the system 400. The historian could, for instance, store information used during production scheduling and optimization. The historian represents any suitable structure for storing and facilitating retrieval of information. Although shown as a single centralized component coupled to the one or more networks, the historian could be located elsewhere in the system 400, or multiple historians could be distributed in different locations in the system 400.

Although FIG. 4 illustrates one example of an industrial process control and automation system 400, various changes may be made to FIG. 4. For example, a control system could include any number of sensors, actuators, controllers, servers, operator stations, networks, and other components. Also, the makeup and arrangement of the system 400 in FIG. 4 is for illustration only. Components could be added, omitted, combined, or placed in any other suitable configuration according to particular needs. Further, particular functions have been described as being performed by particular components of the system 400. This is for illustration only.

Figure 5:
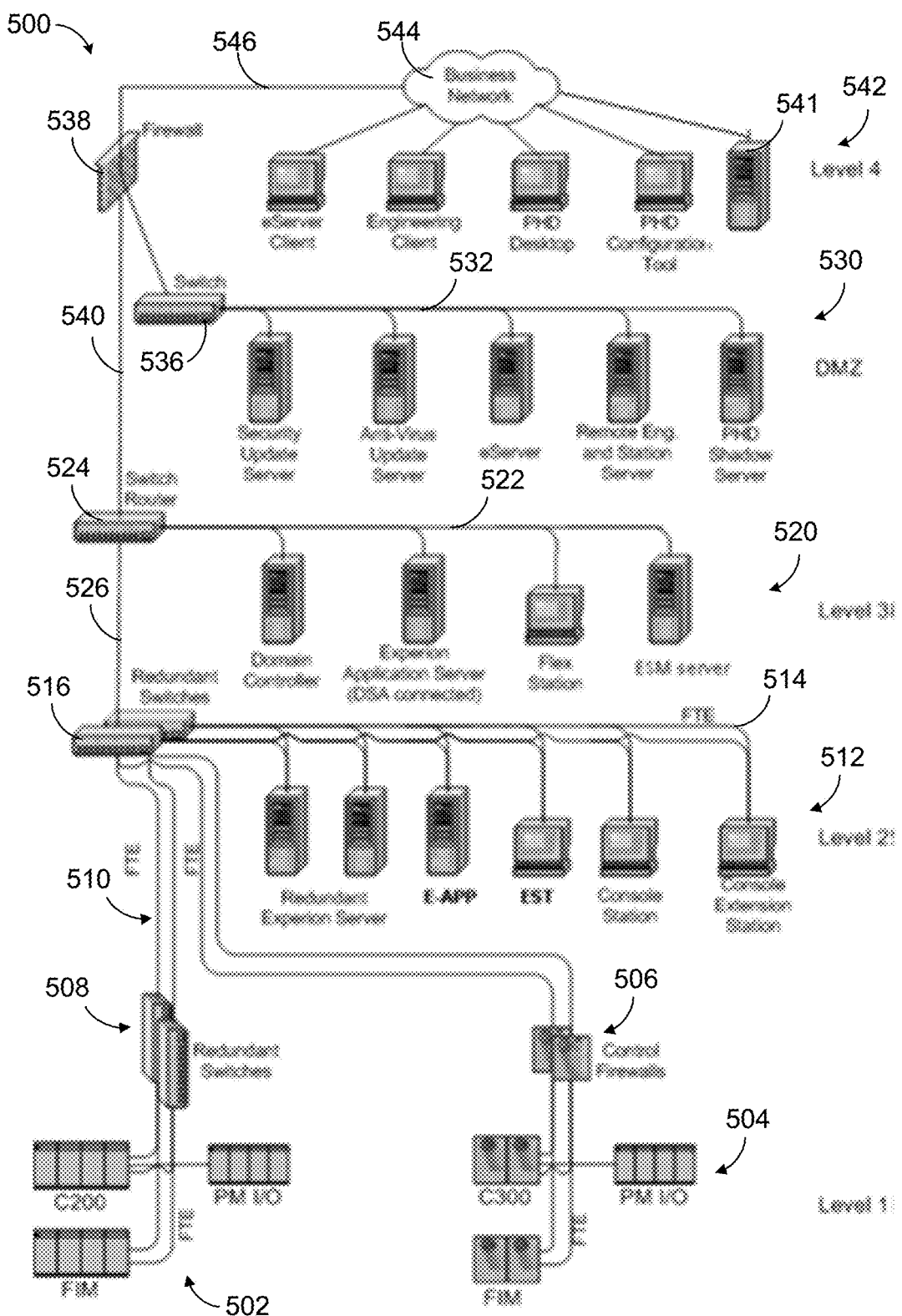

FIG. 5 illustrates an example industrial process control and automation system 500 according to this disclosure. The example industrial process control and automation system 500 illustrated in FIG. 5 may be the same or at least similar to the example industrial process control and automation system 100 illustrated in FIG. 1 or the communication system 300 illustrated in FIG. 3. The example industrial process control and automation system 500 illustrated in FIG. 5 may also include one or more same or similar components of the example industrial process control and automation system 100 illustrated in FIG. 1 or the communication system 300 illustrated in FIG. 3. Additionally, or alternatively, one or more components of the example industrial process control and automation system 500 illustrated in FIG. 5 may include the computing device 200 illustrated in FIG. 2 or may include one or more similar components or features as the computing device 200 illustrated in FIG. 2. The industrial process control and automation system 500 illustrated in FIG. 5 may be for cloud deployment of a server (such as a data analytic server) including an analyzer (such as analyzer 324 illustrated in FIG. 3).

As shown in FIG. 5, the system 500 includes various components that facilitate production or processing of at least one product or other material. For instance, the system 500 is used here to facilitate control over components in one or multiple plants. Each plant represents one or more processing facilities (or one or more portions thereof), such as one or more manufacturing facilities for producing at least one product or other material. In general, each plant may implement one or more processes and can individually or collectively be referred to as a process system. A process system generally represents any system or portion thereof configured to process one or more products or other materials in some manner.

In FIG. 5, the system 500 is implemented using the Purdue model of process control. In the Purdue model, "Level 1" may include a first set of one or more sensors and one or more actuators 502 and a second set of one or more sensor and one or more actuators 504. In certain embodiments, the first set of one or more sensors and one or more actuators 502 may include a C200 sensor, an FIM actuator, and PM I/O device. In certain embodiments, the second set of one or more sensors and one or more actuators 504 may include a C300 sensor, an FIM actuator, and PM I/O device. The sensor and actuators may be the same as the sensors and actuator described herein. The sensors and actuators may represent components in a process system that may perform any of a wide variety of functions. For example, the sensors could measure a wide variety of characteristics in the process system, such as temperature, pressure, or flow rate. Also, the actuators could alter a wide variety of characteristics in the process system. The sensors and actuators could represent any other or additional components in any suitable process system. Each of the sensors includes any suitable structure for measuring one or more characteristics in a process system. Each of the actuators includes any suitable structure for operating on or affecting one or more conditions in a process system. In certain embodiments, the first set of sensors and actuators 502 may be coupled to a network 510 via one or more switches 508 and the second set of sensors and actuators 504 may be coupled to the network 510 via one or more control firewalls 506. In certain embodiments, the network 510 could represent a pair of Ethernet networks or a redundant pair of Ethernet networks, such as a FAULT TOLERANT ETHERNET (FTE) network from HONEYWELL INTERNATIONAL INC.

At least one network may be coupled to each of the first set and the second set of sensors and actuators. The network facilitates interaction with the sensors and actuators. For example, the network could transport measurement data from the sensors and provide control signals to the actuators. The network could represent any suitable network or combination of networks. As particular examples, the network could represent an Ethernet network, an electrical signal network (such as a HART or FOUNDATION FIELDBUS network), a pneumatic control signal network, or any other or additional type(s) of network(s).

In the Purdue model, "Level 2" may include one or more servers 512 (such as controllers) which are coupled to the network 510 of "Level 1" using a network 514 and one or more redundant switches 516. Among other things, each of the servers 512 may use the measurements of sensors and control actuators from first and second set of sensors and actuators 502 and 504, respectively. For example, one of the servers 512 could receive measurement data from one or more sensors and use the measurement data to generate control signals for one or more actuators. Each of servers 512 may include any suitable structure for interacting with one or more sensors and controlling one or more actuators. Each of the servers 512 could, for example, represent a multivariable controller, such as a Robust Multivariable Predictive Control Technology (RMPCT) controller or other type of controller implementing model predictive control (MPC) or other advanced predictive control (APC). As a particular example, each server 512 could represent a computing device running a real-time operating system. In certain embodiments, the servers 512 may include one or more redundant Experion Servers, an E-APP, an EST, a console station, and a console extension station.

The network 514 is coupled to the servers 512. The network 514 facilitates interaction with the each of the servers 512, such as by transporting data to and from the servers 512. The networks 514 could represent any suitable networks or combination of networks. As particular examples, the network 514 could represent a pair of Ethernet networks or a redundant pair of Ethernet networks, such as a FAULT TOLERANT ETHERNET (FTE) network from HONEYWELL INTERNATIONAL INC.

At least one switch/firewall 516 couples the network 514 to the network 510. The switch/firewall 516 may transport traffic from one network to another. The switch/firewall 516 may also block traffic on one network from reaching another network. The switch/firewall 516 includes any suitable structure for providing communication between networks, such as a HONEYWELL CONTROL FIREWALL (CF9) device. The networks 514 could represent any suitable networks, such as a pair of Ethernet networks or an FTE network.

In the Purdue model, "Level 3" may include one or more machine-level servers 520 (such as controllers) coupled to the network 522. The machine-level severs 520 perform various functions to support the operation and control of the servers, sensors, and actuators, which could be associated with a particular piece of industrial equipment (such as a boiler or other machine). For example, the machine-level servers 520 could log information collected or generated by the servers 512, such as measurement data from the sensors or control signals for the actuators. The machine-level servers 520 could also execute applications that control the operation of the servers 512, thereby controlling the operation of the actuators. In addition, the machine-level servers 520 could provide secure access to the servers 512. Each of the machine-level servers 520 includes any suitable structure for providing access to, control of, or operations related to a machine or other individual piece of equipment. Each of the machine-level server 520 could, for example, represent a server computing device running a MICROSOFT WINDOWS operating system. Although not shown, different machine-level server 520 could be used to control different pieces of equipment in a process system (where each piece of equipment is associated with one or more servers 512, sensors, and actuators).

The machine-level servers 520 may include one or more operator stations coupled to the networks 522. The operator stations represent computing or communication devices providing user access to the machine-level servers 520, which could then provide user access to the servers 520 (and possibly the sensors and actuators). As particular examples, the operator stations could allow users to review the operational history of the sensors and actuators using information collected by the servers 512 and/or the machine-level servers 520. The operator stations could also allow the users to adjust the operation of the sensors, actuators, servers 512, or machine-level servers 520. In addition, the operator stations could receive and display warnings, alerts, or other messages or displays generated by the servers 512 or the machine-level servers 520. Each of the operator stations includes any suitable structure for supporting user access and control of one or more components in the system 500. Each of the operator stations could, for example, represent a computing device running a MICROSOFT WINDOWS operating system.

At least one router/firewall 524 couples the network 522 to the network 526 and the redundant switches 516. The router/firewall 524 includes any suitable structure for providing communication between networks, such as a secure router or combination router/firewall. The networks 522 and 526 could represent any suitable networks, such as a pair of Ethernet networks or an FTE network.

In the Purdue model, "Level DMZ" may include one or more unit-level servers 530 (such as a controller) coupled to the networks 532. Each unit-level server 530 is typically associated with a unit in a process system, which represents a collection of different machines operating together to implement at least part of a process. The unit-level servers 530 perform various functions to support the operation and control of components in the lower levels. For example, the unit-level servers 530 could log information collected or generated by the components in the lower levels, execute applications that control the components in the lower levels, and provide secure access to the components in the lower levels. Each of the unit-level servers 530 includes any suitable structure for providing access to, control of, or operations related to one or more machines or other pieces of equipment in a process unit. Each of the unit-level server 530 could, for example, represent a server computing device running a MICROSOFT WINDOWS operating system. Although not shown, different unit-level servers 530 could be used to control different units in a process system (where each unit is associated with one or more machine-level servers 520, servers 512, sensors, and actuators). In certain embodiments, the unit-level servers 530 may include a security update server, an anti-virus update server, an eServer, a remote engineering and station server, and a PHD shadow server.

Access to the unit-level servers 530 may be provided by one or more operator stations. Each of the operator station includes any suitable structure for supporting user access and control of one or more components in the system 500. Each of the operator stations could, for example, represent a computing device running a MICROSOFT WINDOWS operating system.

At least one switch 536 and at least one firewall 538 couples the networks 532 to the network 540 and the router/firewall 524. The switch 536 and firewall 538 may include any suitable structure for providing communication between networks, such as a secure router or combination router/firewall. The networks 532 could represent any suitable networks, such as a pair of Ethernet networks or an FTE network.

In the Purdue model, "Level 4" may include one or more plant-level servers 542 (such as a controller) coupled to the network 544 and the network 546. Each plant-level servers 542 is typically associated with one of the plants, which may include one or more process units that implement the same, similar, or different processes. The plant-level servers 542 perform various functions to support the operation and control of components in the lower levels. As particular examples, the plant-level servers 542 could execute one or more manufacturing execution system (MES) applications, scheduling applications, or other or additional plant or process control applications. Each of the plant-level servers 542 includes any suitable structure for providing access to, control of, or operations related to one or more process units in a process plant. Each of the plant-level servers 542 could, for example, represent a server computing device running a MICROSOFT WINDOWS operating system. In certain embodiments, the plant-level servers 542 may include an eServer, an engineering client, a PHD desktop, and a PHD configuration tool. In certain embodiments, the plant-level servers 542 may include a data analytic server 541 including an analyzer (such as the analyzer 324 illustrated in FIG. 3).

Access to the plant-level servers 542 may be provided by one or more operator stations. Each of the operator stations includes any suitable structure for supporting user access and control of one or more components in the system 500. Each of the operator stations could, for example, represent a computing device running a MICROSOFT WINDOWS operating system.

At least one firewall 538 couples the networks 544 and 546 to the network 540, the switch 536, and the router/firewall 524. The firewall 538 includes any suitable structure for providing communication between networks, such as a secure router or combination router/firewall. The networks 544 and 546 could represent any suitable network, such as an enterprise-wide Ethernet or other network or all or a portion of a larger network (such as the Internet).

In the Purdue model, "Level 5" may include one or more enterprise-level servers (controllers) coupled to a network in communication with the network 546. Each enterprise-level server is typically able to perform planning operations for multiple plants and to control various aspects of the plants. The enterprise-level servers can also perform various functions to support the operation and control of components in the plants. As particular examples, the enterprise-level servers could execute one or more order processing applications, enterprise resource planning (ERP) applications, advanced planning and scheduling (APS) applications, or any other or additional enterprise control applications. Each of the enterprise-level servers includes any suitable structure for providing access to, control of, or operations related to the control of one or more plants. Each of the enterprise-level servers could, for example, represent a server computing device running a MICROSOFT WINDOWS operating system. In this document, the term "enterprise" refers to an organization having one or more plants or other processing facilities to be managed. Note that if a single plant is to be managed, the functionality of the enterprise-level servers could be incorporated into the plant-level servers 542.

Access to the enterprise-level servers may be provided by one or more operator stations. Each of the operator stations includes any suitable structure for supporting user access and control of one or more components in the system 500.

Each of the operator stations could, for example, represent a computing device running a MICROSOFT WINDOWS operating system.

Various levels of the Purdue model can include other components, such as one or more databases or data stores. The database(s) associated with each level could store any suitable information associated with that level or one or more other levels of the system 500. For example, a historian can be coupled to one or more of the networks. The historian could represent a component that stores various information about the system 500. The historian could, for instance, store information used during production scheduling and optimization. The historian represents any suitable structure for storing and facilitating retrieval of information. Although shown as a single centralized component coupled to the one or more networks, the historian could be located elsewhere in the system 500, or multiple historians could be distributed in different locations in the system 500.

Although FIG. 5 illustrates one example of an industrial process control and automation system 500, various changes may be made to FIG. 5. For example, a control system could include any number of sensors, actuators, controllers, servers, operator stations, networks, and other components. Also, the makeup and arrangement of the system 500 in FIG. 5 is for illustration only. Components could be added, omitted, combined, or placed in any other suitable configuration according to particular needs. Further, particular functions have been described as being performed by particular components of the system 500. This is for illustration only. In general, process control and automation systems are highly configurable and can be configured in any suitable manner according to particular needs. In addition, while FIG. 5 illustrates one example environment in which on-process migration of non-redundant I/O firmware can be used, this functionality can be used in any other suitable device or system, and there is no requirement that the device or system be used for industrial process control.

Figure 6:
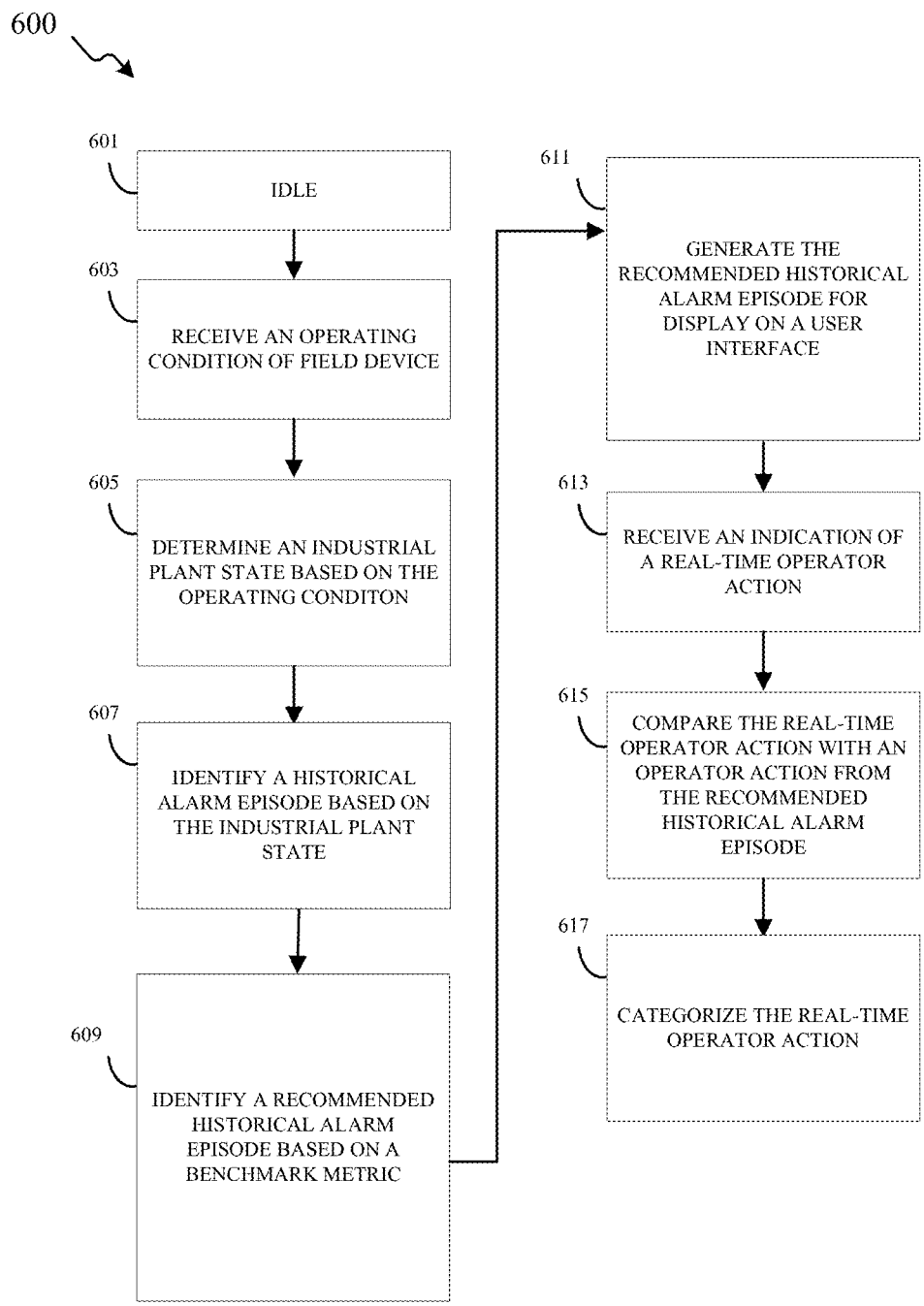
FIG. 6 illustrates an example process according to this disclosure.

FIG. 6 illustrates an example process 600 according to this disclosure. For ease of explanation, the process 600 is described as being implemented using the analyzer 324 of FIG. 3. However, the process 600 could be used with any other suitable devices and in any other suitable system.

Although certain details will be provided with reference to the process 600 of FIG. 6, it should be understood that other embodiments may include more, fewer, or different method operations. At operation 601, the analyzer 324 is in an idle state at least with respect to performing one or more functions described herein. For example, the one or more components of the communication system 300 may be in a normal state. As another example, no components of the communication system 300 may be in an alarm state.

At operation 603, the analyzer 324 receives one or more operating conditions from one or more components or field devices of one or more industrial plants 310. For example, one or more components or field devices may transition from a normal state to an alarm state. The analyzer 324 may receive one or more alarm signals indicating an alarm state when the one or more components transition from a normal state to the alarm state. As another example, the analyzer 324 may receive all operating conditions related to the one or more alarm signals and isolate the one or more operating conditions of all of the operating conditions based on one or more similarity patterns of the one or more operating conditions.

At operation 605, the analyzer 324 determines one or more industrial plant states based on the one or more operating conditions. For example, the analyzer 324 may determine that the industrial plant state is one or more of a startup state, a shutdown state, or a process-related state (such as a fuel switch in a fire heater). In certain embodiments, the industrial plant state includes one or more specific operating conditions (such as process variables) associated with one or more components of one or more industrial plants. The industrial plant states are used to group similar alarm episodes together to derive one or more benchmark alarm episodes suitable for a particular alarm state. The industrial plant state of an industrial plant may be assessed based on alarm grouping, values of linked process variables, and user station metrics.

The analyzer 324 may determine an industrial plant state based on values of linked operating conditions (such as process variables). The analyzer 324 may analyze results of causal pairings to determine which operating conditions are linked. The analyzer 324 may analyze patterns (such as steady state or dynamic patterns including current valves compared to threshold) of linked process variables to determine an industrial plant state. In certain embodiments, the analyzer 324 may group patterns of process variables including rates of change using statistical clustering algorithms to determine an industrial plant state.

The analyzer 324 may determine an industrial plant state based on operating conditions associated with one or more user stations. For example, the analyzer 324 may use operating conditions associated with one or more user stations (such as a rate of received alarms) to evaluate a state of equipment and/or an operator work load. A relatively high rate of alarms may indicate a plant state of a relatively high severity and separate and/or additional analysis may be used. A relatively high rate of operator actions may indicate a transition in operating conditions and separate and/or additional analysis may be used.

At operation 607, the analyzer 324 identifies one or more historical alarm episodes (such as alarm episodes recorded and stored in the historian 315 and/or the information repository 322) based on one or more industrial plant states. In certain embodiments, the one or more historical alarm episodes may include one or more previously performed operator actions that were used to return one or more components of an industrial plant to a normal state from an alarm state. The previously performed operator action may be used to return one or more components of an industrial plant to a normal state from an alarm state in real-time.

For example, the analyzer 324 may have previously determined that a group of alarm episodes are associated with one or more particular industrial plant states. For instance, the analyzer 324 may have previously determined that a group of alarm episodes are associated with one or more particular industrial plant states based on the group alarm episodes having duplicate alarms. For instance, the analyzer 324 may have previously determined that a group of alarm episodes are associated with one or more particular industrial plant states based on the group alarm episodes having consequential alarms. For instance, the analyzer 324 may have previously determined that a group of alarm episodes are associated with one or more particular industrial plant states based on the group alarm episodes having a common cause. When the analyzer 324 determines the industrial plant state based on the operating conditions received when receiving an alarm signal, the analyzer 324 may identify a group of historical alarm episodes that have been grouped together and associated with one or more particular industrial plant states that match or are associated with the determined industrial plant state.

At operation 609, the analyzer 324 identifies one or more recommended historical alarm episodes (such as benchmark alarm episodes) of the one or more identified historical alarm episodes. A recommended historical alarm episode (such as a benchmark alarm episode) may include a best response to or a best action taken as a result of an alarm or an alarm state of one or more components of the industrial plant. In certain embodiments, the analyzer 324 may have previously determined that one or more alarm episodes from each group of alarm episodes are recommended alarm episodes based on one or more benchmark metrics. In certain embodiments, after receiving an alarm signal indicating an alarm state of one or more components of an industrial plant, the analyzer 324 may determine that one or more alarm episodes from a group of alarm episodes associated with one or more determined industrial plant states are recommended alarm episodes based on one or more benchmark metrics.

A benchmark metric may include at least one of an integral of a difference between an actual and alarm trip point during a span of an alarm of the alarm episode, quantity of operator actions that require a least amount of time to return one or more components of an industrial plant to a normal state from an alarm state, a fewest quantity of operator actions to be performed to return one or more components of an industrial plant to a normal state from an alarm state, a fewest quantity of additional adverse conditions that would be generated by performed operator actions to return one or more components of an industrial plant to a normal state from an alarm state, a fewest quantity of plant rules or engineering guidelines that need to be violated to return one or more components of an industrial plant to a normal state from an alarm state, a combination thereof, or the like. The analyzer 324 may compare the data within each alarm episode of a group of alarm episodes to determine one or more benchmark alarm episodes (such as one or more recommended historical alarm episodes) within a group of alarm episodes.

At operation 611, the analyzer 324 may generate the one or more recommended historical alarm episodes (such as one or more benchmark alarm episodes) for display on a user interface. For example, each of the one or more recommended historical alarm episodes may include one or more operator actions that require a least amount of time to return one or more components of an industrial plant to a normal state from an alarm state, that have a fewest quantity to return one or more components of an industrial plant to a normal state from an alarm state, that have a fewest quantity of additional adverse conditions that would be generated by performed operator actions to return one or more components of an industrial plant to a normal state from an alarm state, that have a fewest quantity of plant rules or engineering guidelines that need to be violated to return one or more components of an industrial plant to a normal state from an alarm state, a combination thereof, or the like of one or more groups of alarm episodes associated with the one or more determined industrial plant states. The one or more operator actions may be followed by operators and in accordance with one or more procedures included in the one or more recommended historical alarm episodes to return one or more components of an industrial plant to a normal state from an alarm state in real-time.

At operation 613, the analyzer 324 receives an indication of one or more real-time operator actions after the analyzer 324 generates the one or more recommended historical alarm episodes for display on the user interface. For example, the analyzer 324 may generate for display the one or more operator actions that are for following by operators in accordance with one or more procedures included in the one or more recommended historical alarm episodes to return one or more components of an industrial plant to a normal state from an alarm state in real-time. Subsequently, the analyzer 324 may detect or receive an indication that one or more real-time operator actions are being performed in real-time causing one or more actuators to move in real-time and/or causing one or more sensors to sense one or more parameter changes in real-time.

At operation 615, the analyzer 324 compares the one or more real-time operator actions with the one or more operator actions contained in the one or more recommended historical alarm episodes generated for display after the analyzer 324 generates the one or more recommended historical alarm episodes for display on the user interface. For example, the analyzer 324 may generate for display the one or more operator actions that are for following by operators in accordance with one or more procedures included in the one or more recommended historical alarm episodes to return one or more components of an industrial plant to a normal state from an alarm state in real-time. Subsequently, the analyzer 324 may detect or receive an indication that one or more real-time operator actions are being performed in real-time causing one or more actuators to move in real-time and/or causing one or more sensors to sense one or more operation condition changes in real-time. The analyzer 324 may then compare the real-time operator actions with the one or more operator action included in the one or more recommended historical alarm episodes. In certain embodiments, the analyzer 324 may also compare the real-time movement of the one or more actuators and/or the real-time changes sensed by the one or more sensors with expected actuator movement and/or expected operation conditions changes.

At operation 617, the analyzer 324 categorizes the one or more real-time operator actions based on the comparison of the one or more real-time operator actions with the one or more previously performed operator actions. For example, after the analyzer 324 compares the real-time operator actions with the one or more operator action included in the one or more recommended historical alarm episodes, the analyzer 324 may determine how closely the real-time operator actions match the one or more operator action included in the one or more recommended historical alarm episodes. In certain embodiments, the analyzer 324 may also determine how closely real-time movement of one or more actuators and/or real-time changes sensed by the one or more sensors matches with expected actuator movement and/or expected operation conditions changes. The analyzer 324 may categorize the one or more real-time operator actions based on the match.

In certain embodiments, the analyzer 324 may categorize the one or more real-time operator actions based on a time when the at least one processing device receives the one or more operating conditions and a time when the analyzer 324 receives an indication of one or more normal operating conditions. In certain embodiments, the analyzer 324 may categorize the one or more real-time operator actions based on a quantity of the one or more real-time operator actions received in the indication of the one or more real-time operator actions and a quantity of the one or more previously performed operator actions from the one or more recommended historical alarm episodes. The analyzer 324 may categorize the one or more real-time operator action into at least one of the following categories: "follows benchmarked alarm episode", "deviated in selection of responses", "deviated in magnitude of responses" (increments/rates of manipulations), "deviation response time", "presence of inadvertent operator actions", a combination thereof, or the like.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A method comprising:
   receiving, by at least one processing device, one or more operating conditions from one or more field devices of one or more industrial plants in response to receiving one or more alarm signals;
   determining, by the at least one processing device, one or more industrial plant states based on the one or more operating conditions;
   identifying, by the at least one processing device, one or more historical alarm episodes stored in one or more data stores based on the one or more industrial plant states;
   identifying, by the at least one processing device, one or more recommended historical alarm episodes of the one or more historical alarm episodes based on one or more benchmark metrics of the one or more historical alarm episodes; and
   generating, by the at least one processing device, the one or more recommended historical alarm episodes for display on a user interface,
   wherein the one or more benchmark metrics comprise at least one of:
   an integral of a difference between an actual and alarm trip point during a span of an alarm of the alarm episode,
   a quantity of operator actions that require a least amount of time to return one or more components of an industrial plant to a normal state from an alarm state,
   a fewest quantity of operator actions to be performed to return one or more components of an industrial plant to a normal state from an alarm state,
   a fewest quantity of additional adverse conditions that would be generated by performed operator actions to return one or more components of an industrial plant to a normal state from an alarm state, or
   a fewest quantity of plant rules or engineering guidelines that need to be violated to return one or more components of an industrial plant to a normal state from an alarm state.

2. The method of claim 1, wherein receiving, by the at least one processing device, the one or more operating conditions from the one or more field devices of the one or more industrial plants in response to receiving the one or more alarm signals comprises:
   analyzing, by the at least one processing device, all operating conditions related to the one or more alarm signals; and
   isolating, by the at least one processing device, the one or more operating conditions of all of the operating conditions based on one or more similarity patterns of the one or more operating conditions.

3. The method of claim 1, wherein the one or more historical alarm episodes comprise an indication of one or more previously performed operator actions.

4. The method of claim 3, further comprising:
   after generating, by the at least one processing device, the one or more recommended historical alarm episodes for display on the user interface:
   receiving, by the at least one processing device, an indication of one or more real-time operator actions;
   comparing, by the at least one processing device, the one or more real-time operator actions with the one or more previously performed operator actions; and categorizing, by the at least one processing device, the one or more real-time operator actions based on the comparison of the one or more real-time operator actions with the one or more previously performed operator actions.

5. The method of claim 4, wherein categorizing, by the at least one processing device, the one or more real-time operator actions based on the comparison of the one or more real-time operator actions with the one or more previously performed operator actions further comprises:
categorizing, by the at least one processing device, the one or more real-time operator actions based on a time when the at least one processing device receives the one or more operating conditions and a time when the at least one processing device receives an indication of one or more normal operating conditions.

6. The method of claim 4, wherein categorizing, by the at least one processing device, the one or more real-time operator actions based on the comparison of the one or more real-time operator actions with the one or more previously performed operator actions further comprises:
categorizing, by the at least one processing device, the one or more real-time operator actions based on a quantity of the one or more real-time operator actions received in the indication of the one or more real-time operator actions and a quantity of the one or more previously performed operator actions.

7. An apparatus comprising:
a memory; and
at least one processor configured to:
receive one or more operating conditions from one or more field devices of one or more industrial plants in response to receiving one or more alarm signals,
determine one or more industrial plant states based on the one or more operating conditions,
identify one or more historical alarm episodes stored in one or more data stores based on the one or more industrial plant states,
identify one or more recommended historical alarm episodes of the one or more historical alarm episodes based on one or more benchmark metrics of the one or more historical alarm episodes, and
generate the one or more recommended historical alarm episodes for display on a user interface,
wherein the one or more benchmark metrics comprise at least one of:
an integral of a difference between an actual and alarm trip point during a span of an alarm of the alarm episode,
a quantity of operator actions that require a least amount of time to return one or more components of an industrial plant to a normal state form an alarm state,
a fewest quantity of operator actions to be performed to return one or more components of an industrial plant to normal state from an alarm state,
a fewest quantity of additional adverse conditions that would be generated by performed operator actions to return one or more components of an industrial plant to a normal state from an alarm state, or
a fewest quantity of plant rules or engineering guidelines that need to be violated to return one or more components of an industrial plant to a normal state from an alarm state.

8. The apparatus of claim 7, wherein to receive the one or more operating conditions from the one or more field devices of the one or more industrial plants in response to receiving the one or more alarm signals, the at least one processor is configured to:
analyze all operating conditions related to the one or more alarm signals; and
isolate the one or more operating conditions of all of the operating conditions based on one or more similarity patterns of the one or more operating conditions.

9. The apparatus of claim 7, wherein the one or more historical alarm episodes comprise an indication of one or more previously performed operator actions.

10. The apparatus of claim 9, wherein the at least one processor is further configured to:
after generating the one or more recommended historical alarm episodes for display on the user interface:
receive an indication of one or more real-time operator actions;
compare the one or more real-time operator actions with the one or more previously performed operator actions; and
categorize the one or more real-time operator actions based on the comparison of the one or more real-time operator actions with the one or more previously performed operator actions.

11. The apparatus of claim 10, wherein to categorize the one or more real-time operator actions based on the comparison of the one or more real-time operator actions with the one or more previously performed operator actions, the at least one processor is configured to:
categorize the one or more real-time operator actions based on a time when the at least one processor receives the one or more operating conditions and a time when the at least one processor receives an indication of one or more normal operating conditions.

12. The apparatus of claim 10, wherein to categorize the one or more real-time operator actions based on the comparison of the one or more real-time operator actions with the one or more previously performed operator actions, the at least one processor is configured to:
categorize the one or more real-time operator actions based on a quantity of the one or more real-time operator actions received in the indication of the one or more real-time operator actions and a quantity of the one or more previously performed operator actions.

13. A non-transitory, computer-readable storage medium storing one or more computer executable instructions that, when executed by at least one processor, cause the at least one processor to:
receive one or more operating conditions from one or more field devices of one or more industrial plants in response to receiving one or more alarm signals;
determine one or more industrial plant states based on the one or more operating conditions;
identify one or more historical alarm episodes stored in one or more data stores based on the one or more industrial plant states;
identify one or more recommended historical alarm episodes of the one or more historical alarm episodes based on one or more benchmark metrics of the one or more historical alarm episodes; and
generate the one or more recommended historical alarm episodes for display on a user interface,
wherein the one or more benchmark metrics comprise at least one of:
an integral of a difference between an actual and alarm trip point during a span of an alarm of the alarm episode, a quantity of operator actions that require a least amount of time to return one or more components of an industrial plant to a normal state from an alarm state, a fewest quantity of operator actions to be performed to return one or more components of an industrial plant to a normal state from an alarm state, a fewest quantity of additional adverse conditions that would be generated by performed operator actions to return one or more components of an industrial plant to a normal state from an alarm state, or a fewest quantity of plant rules or engineering guidelines that need to be violated to return one or more components of an industrial plant to a normal state from an alarm state.

14. The non-transitory, computer-readable storage medium of claim 13, wherein to receive the one or more operating conditions from the one or more field devices of the one or more industrial plants in response to receiving the one or more alarm signals, the one or more computer executable instructions cause the at least one processor to:

analyze all operating conditions related to the one or more alarm signals; and isolate the one or more operating conditions of all of the operating conditions based on one or more similarity patterns of the one or more operating conditions.

15. The non-transitory, computer-readable storage medium of claim 13, wherein the one or more historical alarm episodes comprise an indication of one or more previously performed operator actions.

16. The non-transitory, computer-readable storage medium of claim 15, wherein the one or more computer executable instructions further cause the at least one processor to:

after generating the one or more recommended historical alarm episodes for display on the user interface:

receive an indication of one or more real-time operator actions;

compare the one or more real-time operator actions with the one or more previously performed operator actions; and categorize the one or more real-time operator actions based on the comparison of the one or more real-time operator actions with the one or more previously performed operator actions.

17. The non-transitory, computer-readable storage medium of claim 16, wherein to categorize the one or more real-time operator actions based on the comparison of the one or more real-time operator actions with the one or more previously performed operator actions, the one or more computer executable instructions cause the at least one processor to:

categorize the one or more real-time operator actions based on a time when the at least one processor receives the one or more operating conditions and a time when the at least one processor receives an indication of one or more normal operating conditions.

* * * * *